(12) United States Patent
Helferich

(10) Patent No.: US 9,071,953 B2
(45) Date of Patent: Jun. 30, 2015

(54) SYSTEMS AND METHODS PROVIDING ADVERTISEMENTS TO A CELL PHONE BASED ON LOCATION AND EXTERNAL TEMPERATURE

(75) Inventor: Richard J. Helferich, Encinitas, CA (US)

(73) Assignee: Wireless Science, LLC, Phoenix, AZ (US)

( * ) Notice: Subject to any disclaimer, the term of this patent is extended or adjusted under 35 U.S.C. 154(b) by 0 days.

(21) Appl. No.: 12/973,722

(22) Filed: Dec. 20, 2010

(65) Prior Publication Data
US 2011/0092189 A1    Apr. 21, 2011

Related U.S. Application Data

(60) Division of application No. 11/598,202, filed on Nov. 13, 2006, now Pat. No. 8,107,601, which is a continuation of application No. 10/445,257, filed on May 27, 2003, now abandoned, which is a (Continued)

(51) Int. Cl.
*H04W 4/18* (2009.01)
*H04L 12/64* (2006.01)
(Continued)

(52) U.S. Cl.
CPC ............. *H04W 4/18* (2013.01); *H04L 12/6418* (2013.01); *H04L 51/043* (2013.01);
(Continued)

(58) Field of Classification Search
CPC ..... G06C 2250/12; G06F 3/011; H04L 67/22; H04M 2250/12; G06Q 30/02; G06Q 30/0241; G06Q 30/0252; G06Q 30/0276

USPC ................ 455/456.1, 456.2, 456.3; 705/14.4, 705/14.49, 14.5
See application file for complete search history.

(56) References Cited

U.S. PATENT DOCUMENTS

| | | | |
|---|---|---|---|
| 2,003,576 A | 6/1935 | Buhren | |
| 3,118,145 A | 1/1964 | Nee | |

(Continued)

FOREIGN PATENT DOCUMENTS

| | | |
|---|---|---|
| EP | 631419 | 12/1994 |
| EP | 0 695 071 | 1/1996 |

(Continued)

OTHER PUBLICATIONS

Second Request for Inter Partes Reexamination of US Pat 7,499,716, claims 15-18,21-33,37-43,83-86,89-100, and 103-115 Control No. 95/001,867, Andrea G. Reister (Jan. 6, 2012).

(Continued)

*Primary Examiner* — Nizar Sivji
(74) *Attorney, Agent, or Firm* — Law Offices of Steven G. Lisa, Ltd.; Jon E. Kappes, Esq.; Justin J. Lesko, Esq.

(57) ABSTRACT

A messaging system and methods used by content providers to deliver items of content stored in an internet-accessible storage system to a cell phone by causing communication of notifications or paging calls to the cell phone that specify the item of content from among other items of content stored in the storage system and include a system address for the cell phone to initially contact to request the item of content; and methods that identify the system storing the content, that receive identifiers from a separate identification service; that update the content without causing communication of another notification; and that provide for performing action on information at different times, and for selective paging.

6 Claims, 4 Drawing Sheets

Related U.S. Application Data continuation of application No. 09/540,490, filed on Mar. 31, 2000, now Pat. No. 6,636,733, which is a continuation-in-part of application No. 09/408,841, filed on Sep. 30, 1999, now Pat. No. 6,826,407, and a continuation-in-part of application No. 08/934,143, filed on Sep. 19, 1997, now Pat. No. 6,233,430, and a continuation-in-part of application No. 08/933,344, filed on Sep. 19, 1997, now Pat. No. 6,253,061, and a continuation-in-part of application No. 08/934,132, filed on Sep. 19, 1997, now Pat. No. 6,087,956, and a continuation-in-part of application No. 08/934,337, filed on Sep. 19, 1997, now Pat. No. 6,259,892, and a continuation-in-part of application No. 08/989,874, filed on Dec. 12, 1997, now Pat. No. 6,097,941.

(60) Provisional application No. 60/155,055, filed on Sep. 21, 1999, provisional application No. 60/126,939, filed on Mar. 29, 1999.

(51) Int. Cl.
  H04M 3/53 (2006.01)
  H04M 3/533 (2006.01)
  H04W 4/12 (2009.01)
  H04W 68/00 (2009.01)
  H04L 12/58 (2006.01)
  H04M 3/42 (2006.01)
  H04M 11/02 (2006.01)
  H04W 84/02 (2009.01)
  H04W 88/02 (2009.01)
  H04W 88/18 (2009.01)
  H04W 92/02 (2009.01)
  H04W 4/14 (2009.01)

(52) U.S. Cl.
  CPC ............ H04L 51/063 (2013.01); H04L 51/24 (2013.01); *H04L 51/36* (2013.01); *H04L 51/38* (2013.01); *H04L 2012/6421* (2013.01); *H04L 2012/6472* (2013.01); *H04L 2012/6475* (2013.01); *H04L 2012/6481* (2013.01); *H04L 2012/6483* (2013.01); H04M 3/42042 (2013.01); *H04M 3/42059* (2013.01); *H04M 3/42093* (2013.01); H04M 3/5307 (2013.01); H04M 3/533 (2013.01); *H04M 11/022* (2013.01); *H04M 2203/4536* (2013.01); *H04M 2203/658* (2013.01); *H04M 2242/22* (2013.01); H04W 4/12 (2013.01); *H04W 84/025* (2013.01); *H04W 88/022* (2013.01); *H04W 88/023* (2013.01); *H04W 88/184* (2013.01); *H04W 92/02* (2013.01); H04L 51/22 (2013.01); *H04W 4/14* (2013.01); *H04W 68/005* (2013.01)

(56) References Cited

U.S. PATENT DOCUMENTS

| | | |
|---|---|---|
| 3,794,983 A | 2/1974 | Sahin |
| 3,973,200 A | 8/1976 | Akerberg |
| 4,039,761 A | 8/1977 | Nicoud et al. |
| 4,042,906 A | 8/1977 | Ezell |
| 4,124,773 A | 11/1978 | Elkins |
| 4,369,443 A | 1/1983 | Giallanza et al. |
| 4,371,752 A | 2/1983 | Matthews et al. |
| 4,412,217 A | 10/1983 | Willard et al. |
| 4,468,813 A | 8/1984 | Burke et al. |
| 4,480,253 A | 10/1984 | Anderson |
| 4,495,647 A | 1/1985 | Burke et al. |
| 4,549,047 A | 10/1985 | Brian et al. |
| 4,573,140 A | 2/1986 | Szeto |
| 4,602,129 A | 7/1986 | Matthews et al. |
| 4,640,991 A | 2/1987 | Matthews et al. |
| 4,644,352 A | 2/1987 | Fujii |
| 4,654,713 A | 3/1987 | Boucharlat et al. |
| 4,710,955 A | 12/1987 | Kauffman |
| 4,713,837 A | 12/1987 | Gordon |
| 4,737,979 A | 4/1988 | Hashimoto |
| 4,769,641 A | 9/1988 | Yoshizawa et al. |
| 4,769,642 A | 9/1988 | Davis et al. |
| 4,786,902 A | 11/1988 | Davis et al. |
| 4,807,155 A | 2/1989 | Cree et al. |
| 4,811,376 A | 3/1989 | Davis et al. |
| 4,812,843 A | 3/1989 | Champion, III et al. |
| 4,821,308 A | 4/1989 | Hashimoto |
| 4,825,456 A | 4/1989 | Rosenberg |
| 4,837,798 A | 6/1989 | Cohen et al. |
| 4,837,800 A | 6/1989 | Freeburg et al. |
| 4,839,645 A * | 6/1989 | Lill .................... 340/870.17 |
| 4,839,734 A | 6/1989 | Takemura |
| 4,845,491 A | 7/1989 | Fascenda et al. |
| 4,853,688 A | 8/1989 | Andros et al. |
| 4,858,232 A | 8/1989 | Diaz et al. |
| 4,864,301 A | 9/1989 | Helferich |
| 4,868,560 A | 9/1989 | Oliwa et al. |
| 4,873,520 A | 10/1989 | Fisch et al. |
| 4,885,577 A | 12/1989 | Nelson |
| 4,897,835 A | 1/1990 | Gaskill et al. |
| 4,905,003 A | 2/1990 | Helferich |
| 4,916,737 A | 4/1990 | Chomet et al. |
| 4,942,598 A | 7/1990 | Davis |
| 4,949,143 A | 8/1990 | Iesaka et al. |
| 4,961,216 A | 10/1990 | Baehr et al. |
| 4,965,569 A | 10/1990 | Bennett et al. |
| 4,975,694 A | 12/1990 | McLaughlin et al. |
| 5,003,576 A | 3/1991 | Helferich |
| 5,005,013 A | 4/1991 | Tsukamoto et al. |
| 5,007,105 A | 4/1991 | Kudoh et al. |
| 5,029,199 A | 7/1991 | Jones et al. |
| 5,040,204 A | 8/1991 | Sasaki et al. |
| 5,043,721 A | 8/1991 | May |
| 5,047,763 A | 9/1991 | Kuznicki et al. |
| 5,065,423 A | 11/1991 | Gaskill |
| 5,070,536 A | 12/1991 | Mahany et al. |
| 5,093,659 A | 3/1992 | Yamada |
| 5,093,901 A | 3/1992 | Cree et al. |
| 5,115,233 A | 5/1992 | Zdunek et al. |
| 5,117,449 A | 5/1992 | Metroka et al. |
| 5,128,980 A | 7/1992 | Choi |
| 5,128,981 A | 7/1992 | Tsukamoto et al. |
| 5,134,724 A | 7/1992 | Gehring et al. |
| 5,138,311 A | 8/1992 | Weinberg |
| 5,138,312 A | 8/1992 | Tsukamoto et al. |
| 5,140,419 A | 8/1992 | Galumbeck et al. |
| 5,146,612 A | 9/1992 | Grosjean et al. |
| 5,153,582 A | 10/1992 | Davis |
| 5,153,903 A | 10/1992 | Eastmond et al. |
| 5,159,331 A | 10/1992 | Park et al. |
| 5,159,592 A | 10/1992 | Perkins |
| 5,159,713 A | 10/1992 | Gaskill et al. |
| 5,173,688 A | 12/1992 | DeLuca et al. |
| 5,175,758 A | 12/1992 | Levanto et al. |
| 5,177,780 A | 1/1993 | Kasper et al. |
| 5,182,553 A | 1/1993 | Kung |
| 5,185,604 A | 2/1993 | Nepple et al. |
| 5,192,947 A | 3/1993 | Neustein |
| 5,194,857 A | 3/1993 | Gomez |
| 5,212,636 A | 5/1993 | Nakazawa |
| 5,220,366 A | 6/1993 | King |
| 5,227,774 A | 7/1993 | Benoist |
| 5,239,466 A | 8/1993 | Morgan et al. |
| 5,239,679 A | 8/1993 | Murai |
| 5,241,305 A | 8/1993 | Fascenda et al. |
| 5,247,700 A | 9/1993 | Wohl et al. |
| 5,249,230 A | 9/1993 | Mihm, Jr. |
| 5,255,305 A | 10/1993 | Sattar |
| 5,257,307 A | 10/1993 | Ise |
| 5,265,033 A | 11/1993 | Vajk et al. |
| 5,283,818 A | 2/1994 | Klausner et al. |
| 5,285,426 A | 2/1994 | Teodoridis |

(56) References Cited

U.S. PATENT DOCUMENTS

| | | |
|---|---|---|
| 5,285,496 A | 2/1994 | Frank et al. |
| 5,315,635 A | 5/1994 | Kane et al. |
| 5,329,501 A | 7/1994 | Meister et al. |
| 5,329,550 A | 7/1994 | Rousseau et al. |
| 5,333,266 A | 7/1994 | Boaz et al. |
| 5,349,678 A | 9/1994 | Morris et al. |
| 5,375,161 A | 12/1994 | Fuller et al. |
| 5,379,031 A | 1/1995 | Mondrosch et al. |
| 5,390,362 A | 2/1995 | Modjeska et al. |
| 5,392,451 A | 2/1995 | Schwendeman et al. |
| 5,396,537 A | 3/1995 | Schwendeman |
| 5,396,547 A | 3/1995 | Baals et al. |
| 5,398,021 A | 3/1995 | Moore |
| 5,402,466 A | 3/1995 | Delahanty |
| 5,406,557 A | 4/1995 | Baudoin |
| 5,406,616 A | 4/1995 | Bjorndahl |
| 5,410,302 A | 4/1995 | Dulaney, III et al. |
| 5,418,835 A | 5/1995 | Frohman et al. |
| 5,420,922 A | 5/1995 | Lundblad et al. |
| RE34,976 E | 6/1995 | Helferich et al. |
| 5,426,422 A | 6/1995 | Vanden Heuvel et al. |
| 5,426,594 A | 6/1995 | Wright et al. |
| 5,428,663 A | 6/1995 | Grimes et al. |
| 5,428,784 A | 6/1995 | Cahill, Jr. |
| 5,432,839 A | 7/1995 | DeLuca |
| 5,436,960 A | 7/1995 | Campana, Jr. et al. |
| 5,438,611 A | 8/1995 | Campana, Jr. et al. |
| 5,440,559 A | 8/1995 | Gaskill |
| 5,442,706 A | 8/1995 | Kung |
| 5,444,438 A | 8/1995 | Goldberg |
| 5,444,671 A | 8/1995 | Tschannen et al. |
| 5,448,759 A | 9/1995 | Krebs et al. |
| 5,452,356 A | 9/1995 | Albert |
| 5,455,579 A | 10/1995 | Bennett et al. |
| 5,455,823 A | 10/1995 | Noreen et al. |
| 5,457,732 A | 10/1995 | Goldberg |
| 5,463,382 A | 10/1995 | Nikas et al. |
| 5,463,672 A | 10/1995 | Kage |
| 5,473,143 A | 12/1995 | Vak et al. |
| 5,473,320 A | 12/1995 | DeLuca et al. |
| 5,473,667 A | 12/1995 | Neustein |
| 5,475,653 A | 12/1995 | Yamada et al. |
| 5,475,863 A | 12/1995 | Simpson et al. |
| 5,475,866 A | 12/1995 | Ruthenberg |
| 5,479,378 A | 12/1995 | Yamada et al. |
| 5,479,408 A | 12/1995 | Will |
| 5,479,472 A | 12/1995 | Campana, Jr. et al. |
| 5,481,255 A | 1/1996 | Albert et al. |
| 5,483,352 A | 1/1996 | Fukuyama et al. |
| 5,483,595 A | 1/1996 | Owen |
| 5,485,503 A | 1/1996 | Diem |
| 5,487,100 A | 1/1996 | Kane |
| 5,487,167 A | 1/1996 | Dinallo et al. |
| 5,489,894 A | 2/1996 | Murray |
| 5,493,692 A | 2/1996 | Theimer et al. |
| 5,497,373 A | 3/1996 | Hulen et al. |
| 5,506,886 A | 4/1996 | Maine et al. |
| 5,524,009 A | 6/1996 | Tuutijarvi et al. |
| 5,530,438 A | 6/1996 | Bickham et al. |
| 5,530,930 A | 6/1996 | Hahn |
| 5,544,321 A | 8/1996 | Theimer et al. |
| 5,550,535 A | 8/1996 | Park |
| 5,555,376 A | 9/1996 | Theimer et al. |
| 5,555,446 A | 9/1996 | Jasinski |
| 5,557,606 A | 9/1996 | Moon |
| 5,557,659 A | 9/1996 | Hyde-Thomson |
| 5,557,749 A | 9/1996 | Norris |
| 5,559,800 A | 9/1996 | Mousseau et al. |
| 5,559,862 A | 9/1996 | Bhagat et al. |
| 5,561,702 A | 10/1996 | Lipp et al. |
| 5,564,018 A | 10/1996 | Flores et al. |
| 5,568,536 A | 10/1996 | Tiller et al. |
| 5,568,540 A | 10/1996 | Greco et al. |
| 5,572,196 A | 11/1996 | Sakumoto et al. |
| 5,572,488 A | 11/1996 | Yamada et al. |
| 5,579,372 A | 11/1996 | Astrom |
| 5,581,366 A | 12/1996 | Merchant et al. |
| 5,581,593 A | 12/1996 | Engelke et al. |
| 5,584,070 A | 12/1996 | Harris et al. |
| 5,588,009 A | 12/1996 | Will |
| 5,590,092 A | 12/1996 | Fehnel |
| 5,592,532 A | 1/1997 | Koizumi et al. |
| 5,600,703 A | 2/1997 | Dang et al. |
| 5,600,708 A | 2/1997 | Meche et al. |
| 5,603,054 A | 2/1997 | Theimer et al. |
| 5,604,788 A | 2/1997 | Tett |
| 5,608,446 A | 3/1997 | Carr et al. |
| 5,608,786 A | 3/1997 | Gordon |
| 5,611,050 A | 3/1997 | Theimer et al. |
| 5,623,242 A | 4/1997 | Dawson, Jr. et al. |
| 5,625,870 A | 4/1997 | Moon |
| 5,627,525 A | 5/1997 | Kudoh et al. |
| 5,627,876 A | 5/1997 | Moon |
| 5,630,060 A | 5/1997 | Tang et al. |
| 5,630,207 A | 5/1997 | Gitlin et al. |
| 5,631,635 A | 5/1997 | Robertson |
| 5,631,948 A | 5/1997 | Bartholomew et al. |
| 5,633,916 A | 5/1997 | Goldhagen et al. |
| 5,635,918 A | 6/1997 | Tett |
| 5,636,265 A | 6/1997 | O'Connell et al. |
| 5,638,369 A | 6/1997 | Ayerst et al. |
| 5,644,627 A | 7/1997 | Segal et al. |
| 5,649,305 A | 7/1997 | Yoshida |
| 5,652,789 A | 7/1997 | Miner et al. |
| 5,654,942 A | 8/1997 | Akahane |
| 5,661,782 A | 8/1997 | Bartholomew et al. |
| 5,663,703 A | 9/1997 | Pearlman et al. |
| 5,668,880 A | 9/1997 | Alajajian |
| 5,675,507 A | 10/1997 | Bobo, II |
| 5,675,627 A | 10/1997 | Yaker |
| 5,678,176 A | 10/1997 | Moon |
| 5,678,179 A | 10/1997 | Turcotte et al. |
| 5,680,442 A | 10/1997 | Bartholomew et al. |
| 5,684,859 A | 11/1997 | Chanroo et al. |
| 5,694,120 A | 12/1997 | Indekeu et al. |
| 5,694,454 A | 12/1997 | Hill et al. |
| 5,696,500 A | 12/1997 | Diem |
| 5,699,053 A | 12/1997 | Jonsson |
| 5,703,934 A | 12/1997 | Zicker et al. |
| 5,706,211 A | 1/1998 | Beletic et al. |
| 5,706,434 A | 1/1998 | Fraize et al. |
| 5,710,816 A | 1/1998 | Stork et al. |
| 5,717,742 A | 2/1998 | Hyde-Thomson |
| 5,722,071 A | 2/1998 | Berg et al. |
| 5,724,410 A | 3/1998 | Parvulescu et al. |
| 5,724,424 A | 3/1998 | Gifford |
| 5,726,643 A | 3/1998 | Tani |
| 5,737,394 A | 4/1998 | Anderson et al. |
| 5,737,395 A | 4/1998 | Irribarren |
| 5,737,688 A | 4/1998 | Sakai et al. |
| 5,740,230 A | 4/1998 | Vaudreuil |
| 5,742,668 A | 4/1998 | Pepe et al. |
| 5,742,905 A | 4/1998 | Pepe et al. |
| 5,745,689 A | 4/1998 | Yeager et al. |
| 5,751,706 A | 5/1998 | Land et al. |
| 5,751,793 A | 5/1998 | Davies et al. |
| 5,751,814 A | 5/1998 | Kafri |
| 5,752,191 A | 5/1998 | Fuller et al. |
| 5,761,622 A | 6/1998 | Priest |
| 5,768,381 A | 6/1998 | Hawthorne |
| 5,768,509 A | 6/1998 | Günlük |
| 5,774,803 A | 6/1998 | Kariya |
| 5,774,824 A | 6/1998 | Streit et al. |
| 5,778,304 A | 7/1998 | Grube et al. |
| 5,778,315 A | 7/1998 | Proietti |
| 5,781,857 A | 7/1998 | Hwang et al. |
| 5,787,345 A | 7/1998 | Moon |
| 5,796,394 A | 8/1998 | Wicks et al. |
| 5,797,091 A | 8/1998 | Clise et al. |
| 5,802,165 A | 9/1998 | Kim |
| 5,802,466 A | 9/1998 | Gallant et al. |
| 5,805,886 A | 9/1998 | Skarbo et al. |
| 5,809,115 A | 9/1998 | Inkinen |
| 5,809,116 A | 9/1998 | Cairo |

(56) References Cited

U.S. PATENT DOCUMENTS

| | | |
|---|---|---|
| 5,809,130 A | 9/1998 | Ayala |
| 5,809,413 A | 9/1998 | Meche et al. |
| 5,809,415 A | 9/1998 | Rossmann |
| 5,809,424 A | 9/1998 | Eizenhoefer |
| 5,809,428 A | 9/1998 | Garahi et al. |
| 5,812,639 A | 9/1998 | Bartholomew et al. |
| 5,812,671 A | 9/1998 | Ross, Jr. |
| 5,812,776 A | 9/1998 | Gifford |
| 5,812,795 A | 9/1998 | Horovitz et al. |
| 5,812,865 A | 9/1998 | Theimer et al. |
| 5,815,800 A | 9/1998 | Su et al. |
| 5,818,824 A | 10/1998 | Lu et al. |
| 5,821,874 A | 10/1998 | Parvulescu et al. |
| 5,826,187 A | 10/1998 | Core et al. |
| 5,826,191 A | 10/1998 | Krishnan |
| 5,828,882 A | 10/1998 | Hinckley |
| 5,835,089 A | 11/1998 | Skarbo et al. |
| 5,838,252 A | 11/1998 | Kikinis |
| 5,839,902 A | 11/1998 | Wood |
| 5,841,837 A | 11/1998 | Fuller et al. |
| 5,845,202 A | 12/1998 | Davis |
| 5,845,211 A | 12/1998 | Roach, Jr. |
| 5,850,520 A | 12/1998 | Griebenow et al. |
| 5,850,594 A | 12/1998 | Cannon et al. |
| 5,857,020 A | 1/1999 | Peterson, Jr. |
| 5,862,325 A | 1/1999 | Reed et al. |
| 5,864,606 A | 1/1999 | Hanson et al. |
| 5,867,793 A | 2/1999 | Davis |
| 5,870,030 A | 2/1999 | DeLuca et al. |
| 5,870,454 A | 2/1999 | Dahlen |
| 5,872,779 A | 2/1999 | Vaudreuil |
| 5,872,847 A | 2/1999 | Boyle et al. |
| 5,872,926 A | 2/1999 | Levac et al. |
| 5,872,930 A | 2/1999 | Masters et al. |
| 5,875,436 A | 2/1999 | Kikinis |
| 5,878,230 A | 3/1999 | Weber et al. |
| 5,878,351 A | 3/1999 | Alanara et al. |
| 5,880,731 A | 3/1999 | Liles et al. |
| 5,884,159 A | 3/1999 | Thro et al. |
| 5,884,160 A | 3/1999 | Kanazaki |
| 5,887,249 A | 3/1999 | Schmid |
| 5,889,852 A | 3/1999 | Rosecrans et al. |
| 5,892,909 A | 4/1999 | Grasso et al. |
| 5,893,032 A | 4/1999 | Maeda et al. |
| 5,893,091 A | 4/1999 | Hunt et al. |
| 5,895,471 A | 4/1999 | King et al. |
| 5,903,723 A | 5/1999 | Beck et al. |
| 5,903,845 A | 5/1999 | Buhrmann et al. |
| 5,905,495 A | 5/1999 | Tanaka et al. |
| 5,905,777 A | 5/1999 | Foladare et al. |
| 5,905,789 A | 5/1999 | Will |
| 5,905,865 A | 5/1999 | Palmer et al. |
| 5,907,680 A | 5/1999 | Nielsen |
| 5,907,805 A | 5/1999 | Chotai |
| 5,909,491 A | 6/1999 | Luo |
| 5,913,032 A | 6/1999 | Schwartz et al. |
| 5,918,158 A | 6/1999 | LaPorta et al. |
| 5,918,180 A | 6/1999 | Dimino |
| 5,920,826 A | 7/1999 | Metso et al. |
| 5,924,016 A | 7/1999 | Fuller et al. |
| 5,928,325 A | 7/1999 | Shaughnessy et al. |
| 5,930,250 A | 7/1999 | Klok et al. |
| 5,930,471 A | 7/1999 | Milewski et al. |
| 5,930,701 A | 7/1999 | Skog |
| 5,933,478 A | 8/1999 | Ozaki et al. |
| 5,936,547 A | 8/1999 | Lund |
| 5,938,721 A | 8/1999 | Dussell et al. |
| 5,938,725 A | 8/1999 | Hara |
| 5,943,397 A | 8/1999 | Gabin et al. |
| 5,943,478 A | 8/1999 | Aggarwal et al. |
| 5,946,618 A | 8/1999 | Agre et al. |
| 5,946,629 A | 8/1999 | Sawyer |
| 5,948,059 A | 9/1999 | Woo et al. |
| 5,951,638 A | 9/1999 | Hoss et al. |
| 5,958,006 A | 9/1999 | Eggleston et al. |
| 5,961,590 A | 10/1999 | Mendez et al. |
| 5,961,620 A | 10/1999 | Trent et al. |
| 5,963,618 A | 10/1999 | Porter |
| 5,966,652 A | 10/1999 | Coad et al. |
| 5,974,447 A | 10/1999 | Cannon et al. |
| 5,974,449 A | 10/1999 | Chang et al. |
| 5,974,451 A | 10/1999 | Simmons |
| 5,978,673 A | 11/1999 | Alperovich et al. |
| 5,978,837 A | 11/1999 | Foladare et al. |
| 5,988,857 A | 11/1999 | Ozawa et al. |
| 5,991,615 A | 11/1999 | Coppinger et al. |
| 5,995,597 A | 11/1999 | Woltz et al. |
| 6,009,173 A | 12/1999 | Sumner |
| 6,011,973 A | 1/2000 | Valentine et al. |
| 6,014,559 A | 1/2000 | Amin |
| 6,014,607 A | 1/2000 | Yagyu et al. |
| 6,018,654 A | 1/2000 | Valentine et al. |
| 6,018,657 A | 1/2000 | Kennedy et al. |
| 6,018,774 A | 1/2000 | Mayle et al. |
| 6,021,114 A | 2/2000 | Shaffer et al. |
| 6,021,190 A | 2/2000 | Fuller et al. |
| 6,021,394 A * | 2/2000 | Takahashi ............ 705/7.31 |
| 6,021,433 A | 2/2000 | Payne et al. |
| 6,026,153 A | 2/2000 | Fuller et al. |
| 6,026,292 A | 2/2000 | Coppinger et al. |
| 6,029,065 A | 2/2000 | Shah |
| 6,029,171 A | 2/2000 | Smiga et al. |
| 6,032,039 A | 2/2000 | Kaplan |
| 6,035,104 A | 3/2000 | Zahariev |
| 6,038,451 A | 3/2000 | Syed et al. |
| 6,044,247 A | 3/2000 | Taskett et al. |
| 6,047,053 A | 4/2000 | Miner et al. |
| 6,047,327 A | 4/2000 | Tso et al. |
| 6,049,821 A | 4/2000 | Theriault et al. |
| 6,052,442 A | 4/2000 | Cooper et al. |
| 6,052,595 A | 4/2000 | Schellinger et al. |
| 6,058,304 A | 5/2000 | Callaghan et al. |
| 6,060,997 A | 5/2000 | Taubenheim et al. |
| 6,061,570 A | 5/2000 | Janow |
| 6,064,342 A | 5/2000 | Sandhu et al. |
| 6,064,879 A | 5/2000 | Fujiwara et al. |
| 6,067,082 A | 5/2000 | Enmei |
| 6,070,067 A | 5/2000 | Nguyen et al. |
| 6,081,703 A | 6/2000 | Hallqvist |
| 6,085,096 A | 7/2000 | Nakamura |
| 6,087,956 A | 7/2000 | Helferich |
| 6,088,127 A | 7/2000 | Pieterse |
| 6,088,717 A | 7/2000 | Reed et al. |
| 6,091,948 A | 7/2000 | Carr et al. |
| 6,091,957 A | 7/2000 | Larkins et al. |
| 6,094,574 A | 7/2000 | Vance et al. |
| 6,097,941 A | 8/2000 | Helferich |
| 6,101,531 A | 8/2000 | Eggleston et al. |
| 6,104,913 A | 8/2000 | McAllister |
| 6,115,248 A | 9/2000 | Canova et al. |
| 6,119,167 A | 9/2000 | Boyle et al. |
| 6,122,484 A | 9/2000 | Fuller et al. |
| 6,125,281 A | 9/2000 | Wells et al. |
| 6,128,490 A | 10/2000 | Shaheen et al. |
| 6,134,325 A | 10/2000 | Vanstone et al. |
| 6,134,432 A | 10/2000 | Holmes et al. |
| 6,137,864 A | 10/2000 | Yaker |
| 6,138,158 A | 10/2000 | Boyle et al. |
| 6,141,666 A | 10/2000 | Tobin |
| 6,144,313 A | 11/2000 | Nakano |
| 6,144,671 A | 11/2000 | Perinpanathan et al. |
| 6,145,079 A | 11/2000 | Mitty |
| 6,147,314 A | 11/2000 | Han et al. |
| 6,151,443 A | 11/2000 | Gable et al. |
| 6,151,491 A | 11/2000 | Farris et al. |
| 6,151,507 A | 11/2000 | Laiho |
| 6,169,883 B1 | 1/2001 | Vimpari et al. |
| 6,169,911 B1 | 1/2001 | Wagner et al. |
| 6,175,859 B1 | 1/2001 | Mohler |
| 6,178,331 B1 | 1/2001 | Holmes et al. |
| 6,185,423 B1 | 2/2001 | Brown et al. |
| 6,192,407 B1 | 2/2001 | Smith et al. |
| 6,195,564 B1 | 2/2001 | Rydbeck et al. |
| 6,201,974 B1 | 3/2001 | Leitsalmi et al. |

(56) References Cited

U.S. PATENT DOCUMENTS

| | | |
|---|---|---|
| 6,205,330 B1 | 3/2001 | Winbladh |
| 6,208,839 B1 | 3/2001 | Davani |
| 6,211,799 B1 | 4/2001 | Post et al. |
| 6,212,390 B1 | 4/2001 | Rune |
| 6,212,550 B1 | 4/2001 | Segur |
| 6,215,858 B1 | 4/2001 | Bartholomew et al. |
| 6,216,086 B1 | 4/2001 | Seymour et al. |
| 6,216,165 B1 | 4/2001 | Woltz et al. |
| 6,219,694 B1 | 4/2001 | Lazaridis et al. |
| 6,222,857 B1 | 4/2001 | Kammer et al. |
| 6,223,018 B1 | 4/2001 | Fukumoto et al. |
| 6,223,042 B1 | 4/2001 | Raffel |
| 6,226,495 B1 | 5/2001 | Neustein |
| 6,226,533 B1 | 5/2001 | Akahane |
| 6,230,017 B1 | 5/2001 | Andersson et al. |
| 6,230,133 B1 | 5/2001 | Bennett, III et al. |
| 6,230,188 B1 | 5/2001 | Marcus |
| 6,230,202 B1 | 5/2001 | Lewine |
| 6,233,318 B1 | 5/2001 | Picard et al. |
| 6,233,430 B1 | 5/2001 | Helferich |
| 6,233,448 B1 | 5/2001 | Alperovich et al. |
| 6,236,768 B1 | 5/2001 | Rhodes et al. |
| 6,236,804 B1 | 5/2001 | Tozaki et al. |
| 6,246,871 B1 | 6/2001 | Ala/Laurila |
| 6,252,588 B1 | 6/2001 | Dawson |
| 6,253,061 B1 | 6/2001 | Helferich |
| 6,259,405 B1 | 7/2001 | Stewart et al. |
| 6,259,892 B1 | 7/2001 | Helferich |
| 6,269,343 B1 | 7/2001 | Pallakoff |
| 6,272,532 B1 | 8/2001 | Feinleib |
| 6,278,862 B1 | 8/2001 | Henderson |
| 6,282,435 B1 | 8/2001 | Wagner et al. |
| 6,285,745 B1 | 9/2001 | Bartholomew et al. |
| 6,285,777 B2 | 9/2001 | Kanevsky et al. |
| 6,288,715 B1 | 9/2001 | Bain et al. |
| 6,292,668 B1 | 9/2001 | Alanara et al. |
| 6,298,231 B1 | 10/2001 | Heinz |
| 6,301,471 B1 | 10/2001 | Dahm et al. |
| 6,301,513 B1 | 10/2001 | Divon et al. |
| 6,317,085 B1 | 11/2001 | Sandhu et al. |
| 6,317,594 B1 | 11/2001 | Gossman et al. |
| 6,320,534 B1 | 11/2001 | Goss |
| 6,320,957 B1 | 11/2001 | Draganoff |
| 6,321,094 B1 | 11/2001 | Hayashi et al. |
| 6,321,267 B1 | 11/2001 | Donaldson |
| 6,324,404 B1 | 11/2001 | Dennison et al. |
| 6,330,079 B1 | 12/2001 | Dugan et al. |
| 6,330,244 B1 | 12/2001 | Swartz et al. |
| 6,330,308 B1 | 12/2001 | Cheston et al. |
| 6,333,919 B2 | 12/2001 | Gaffney |
| 6,333,973 B1 | 12/2001 | Smith et al. |
| 6,339,746 B1 | 1/2002 | Sugiyama et al. |
| 6,343,219 B1 | 1/2002 | Wada |
| 6,344,848 B1 | 2/2002 | Rowe et al. |
| 6,351,523 B1 | 2/2002 | Detlef |
| 6,356,939 B1 | 3/2002 | Dahl |
| 6,361,523 B1 | 3/2002 | Bierman |
| 6,363,082 B1 | 3/2002 | Kammer et al. |
| RE37,618 E | 4/2002 | Helferich |
| 6,370,389 B1 | 4/2002 | Isomursu et al. |
| 6,373,835 B1 | 4/2002 | Ng et al. |
| 6,381,465 B1 * | 4/2002 | Chern et al. .............. 455/466 |
| 6,381,650 B1 | 4/2002 | Peacock et al. |
| 6,388,877 B1 | 5/2002 | Canova et al. |
| 6,389,288 B1 | 5/2002 | Kuwahara et al. |
| 6,389,457 B2 | 5/2002 | Lazaridis et al. |
| 6,389,572 B1 | 5/2002 | Garrabrant et al. |
| 6,397,059 B1 | 5/2002 | Vance et al. |
| 6,401,113 B2 | 6/2002 | Lazaridis et al. |
| 6,411,827 B1 | 6/2002 | Minata |
| 6,418,305 B1 | 7/2002 | Neustein |
| 6,418,307 B1 | 7/2002 | Amin |
| 6,421,678 B2 | 7/2002 | Smiga et al. |
| 6,422,147 B1 | 7/2002 | Shann |
| 6,424,820 B1 | 7/2002 | Burdick et al. |
| 6,424,841 B1 | 7/2002 | Gustafsson |
| 6,425,087 B1 | 7/2002 | Osborn et al. |
| 6,438,585 B2 | 8/2002 | Mousseau et al. |
| 6,441,824 B2 | 8/2002 | Hertzfeld et al. |
| 6,442,243 B1 | 8/2002 | Valco et al. |
| 6,442,616 B1 | 8/2002 | Inoue et al. |
| 6,442,637 B1 | 8/2002 | Hawkins et al. |
| 6,449,344 B1 | 9/2002 | Goldfinger |
| 6,457,134 B1 | 9/2002 | Lemke et al. |
| 6,459,360 B1 | 10/2002 | Helferich |
| 6,462,646 B2 | 10/2002 | Helferich |
| 6,463,463 B1 | 10/2002 | Godfrey et al. |
| 6,463,464 B1 | 10/2002 | Lazaridis et al. |
| 6,484,027 B1 | 11/2002 | Mauney et al. |
| 6,501,834 B1 | 12/2002 | Milewski et al. |
| 6,505,046 B1 | 1/2003 | Baker |
| 6,505,237 B2 | 1/2003 | Beyda et al. |
| 6,510,453 B1 | 1/2003 | Apfel et al. |
| 6,516,202 B1 | 2/2003 | Hawkins et al. |
| 6,522,877 B1 | 2/2003 | Lietsalmi et al. |
| 6,522,879 B2 | 2/2003 | Myer et al. |
| 6,523,124 B1 | 2/2003 | Lunsford et al. |
| 6,526,127 B1 | 2/2003 | Piotrowski et al. |
| 6,539,230 B2 | 3/2003 | Yen |
| 6,539,476 B1 | 3/2003 | Marianetti et al. |
| 6,546,083 B1 | 4/2003 | Chaves et al. |
| 6,564,143 B1 | 5/2003 | Alewine et al. |
| 6,564,249 B2 | 5/2003 | Shiigi |
| 6,567,179 B1 | 5/2003 | Sato et al. |
| 6,580,784 B2 | 6/2003 | Rodriguez et al. |
| 6,580,787 B1 | 6/2003 | Akhteruzzaman et al. |
| 6,587,681 B1 | 7/2003 | Sawai |
| 6,587,693 B1 | 7/2003 | Lumme et al. |
| 6,590,588 B2 | 7/2003 | Lincke et al. |
| 6,597,688 B2 | 7/2003 | Narasimhan et al. |
| 6,597,903 B1 | 7/2003 | Dahm et al. |
| 6,611,254 B1 | 8/2003 | Griffin et al. |
| 6,622,147 B1 | 9/2003 | Smiga et al. |
| 6,625,142 B1 | 9/2003 | Joffe et al. |
| 6,625,455 B1 | 9/2003 | Ariga |
| 6,625,642 B1 | 9/2003 | Naylor et al. |
| 6,636,522 B1 | 10/2003 | Perinpanathan et al. |
| 6,636,733 B1 | 10/2003 | Helferich |
| 6,647,257 B2 | 11/2003 | Owensby |
| 6,650,901 B1 | 11/2003 | Schuster et al. |
| 6,658,409 B1 | 12/2003 | Nomura et al. |
| 6,662,195 B1 | 12/2003 | Langseth et al. |
| 6,665,547 B1 | 12/2003 | Ehara |
| 6,665,803 B2 | 12/2003 | Lunsford et al. |
| 6,671,715 B1 | 12/2003 | Langseth et al. |
| 6,675,002 B1 | 1/2004 | Lipovski |
| 6,687,839 B1 | 2/2004 | Tate et al. |
| 6,694,316 B1 | 2/2004 | Langseth et al. |
| 6,701,378 B1 | 3/2004 | Gilhuly et al. |
| 6,714,859 B2 | 3/2004 | Jones |
| 6,728,530 B1 | 4/2004 | Heinonen et al. |
| 6,741,927 B2 | 5/2004 | Jones |
| 6,741,980 B1 | 5/2004 | Langseth et al. |
| 6,744,528 B2 | 6/2004 | Picoult et al. |
| 6,744,874 B2 | 6/2004 | Wu |
| 6,748,226 B1 | 6/2004 | Wortham |
| 6,750,881 B1 | 6/2004 | Appelman |
| 6,751,453 B2 | 6/2004 | Schemers et al. |
| 6,754,181 B1 | 6/2004 | Elliott et al. |
| 6,760,423 B1 | 7/2004 | Todd |
| 6,766,490 B1 | 7/2004 | Garrabrant et al. |
| 6,771,949 B1 | 8/2004 | Corliss |
| 6,775,264 B1 | 8/2004 | Kurganov |
| 6,775,689 B1 | 8/2004 | Raghunandan |
| 6,779,019 B1 | 8/2004 | Mousseau et al. |
| 6,779,022 B1 | 8/2004 | Rothkopf et al. |
| 6,788,767 B2 | 9/2004 | Lambke |
| 6,792,112 B1 | 9/2004 | Campbell et al. |
| 6,792,544 B2 | 9/2004 | Hashem et al. |
| 6,804,606 B2 | 10/2004 | Jones |
| 6,807,277 B1 | 10/2004 | Doonan et al. |
| 6,813,489 B1 | 11/2004 | Wu et al. |
| 6,816,723 B1 | 11/2004 | Borland |
| 6,819,919 B1 | 11/2004 | Tanaka |

(56) References Cited

U.S. PATENT DOCUMENTS

| | | |
|---|---|---|
| 6,823,225 B1 | 11/2004 | Sass |
| 6,826,407 B1 | 11/2004 | Helferich |
| 6,832,093 B1 | 12/2004 | Ranta |
| 6,832,130 B2 | 12/2004 | Pintsov et al. |
| 6,839,560 B1 | 1/2005 | Bahl et al. |
| 6,868,498 B1 | 3/2005 | Katsikas |
| 6,869,016 B2 | 3/2005 | Waxelbaum |
| 6,871,214 B2 | 3/2005 | Parsons et al. |
| 6,880,079 B2 | 4/2005 | Kefford et al. |
| 6,882,709 B1 | 4/2005 | Sherlock et al. |
| 6,886,096 B2 | 4/2005 | Appenseller et al. |
| 6,892,074 B2 | 5/2005 | Tarkiainen et al. |
| 6,904,359 B2 | 6/2005 | Jones |
| 6,912,285 B2 | 6/2005 | Jevans |
| 6,912,400 B1 | 6/2005 | Olsson et al. |
| RE38,787 E | 8/2005 | Sainton et al. |
| 6,938,065 B2 | 8/2005 | Jain |
| 6,941,349 B2 | 9/2005 | Godfrey et al. |
| 6,944,283 B1 | 9/2005 | Klein |
| 6,950,679 B2 | 9/2005 | Sugiyama et al. |
| 6,952,599 B2 | 10/2005 | Noda et al. |
| 6,952,645 B1 | 10/2005 | Jones |
| 6,965,868 B1 | 11/2005 | Bednarek |
| 6,980,531 B1 | 12/2005 | Rudrapatna |
| 6,980,792 B2 | 12/2005 | Iivonen et al. |
| 6,983,138 B1 | 1/2006 | Helferich |
| 6,983,156 B2 | 1/2006 | Fukushima et al. |
| 6,990,587 B2 | 1/2006 | Willins et al. |
| 7,003,308 B1 | 2/2006 | Fuoss et al. |
| 7,006,459 B2 | 2/2006 | Kokot et al. |
| 7,007,239 B1 | 2/2006 | Hawkins et al. |
| 7,013,391 B2 | 3/2006 | Herle et al. |
| 7,017,181 B2 | 3/2006 | Spies et al. |
| 7,020,688 B2 | 3/2006 | Sykes, Jr. |
| 7,023,967 B1 | 4/2006 | Andersson et al. |
| 7,031,437 B1 | 4/2006 | Parsons et al. |
| 7,054,905 B1 | 5/2006 | Hanna et al. |
| 7,058,390 B2 | 6/2006 | Chikazawa |
| 7,062,536 B2 | 6/2006 | Fellenstein et al. |
| 7,063,263 B2 | 6/2006 | Swartz et al. |
| 7,065,189 B2 | 6/2006 | Wakabayashi |
| 7,068,993 B2 | 6/2006 | Rai et al. |
| 7,072,642 B2 | 7/2006 | Yabe et al. |
| 7,076,528 B2 | 7/2006 | Premutico |
| 7,079,006 B1 | 7/2006 | Abe |
| 7,082,469 B2 | 7/2006 | Gold et al. |
| 7,082,536 B2 | 7/2006 | Filipi-Martin |
| 7,088,245 B2 | 8/2006 | Guntersdorfer et al. |
| 7,088,990 B1 | 8/2006 | Isomursu et al. |
| 7,092,743 B2 | 8/2006 | Vegh |
| 7,100,048 B1 | 8/2006 | Czajkowski et al. |
| 7,107,246 B2 | 9/2006 | Wang |
| 7,113,601 B2 | 9/2006 | Ananda |
| 7,113,803 B2 | 9/2006 | Dehlin |
| 7,113,979 B1 | 9/2006 | Smith et al. |
| 7,116,762 B2 | 10/2006 | Bennett, III et al. |
| 7,116,997 B2 | 10/2006 | Byers et al. |
| 7,133,687 B1 | 11/2006 | El-Fishawy et al. |
| 7,146,009 B2 | 12/2006 | Andivahis et al. |
| 7,149,537 B1 | 12/2006 | Kupsh et al. |
| 7,149,893 B1 | 12/2006 | Leonard et al. |
| 7,155,241 B2 | 12/2006 | Helferich |
| 7,171,221 B1 | 1/2007 | Amin et al. |
| 7,188,186 B1 | 3/2007 | Meyer et al. |
| 7,191,058 B2 | 3/2007 | Laird et al. |
| 7,218,919 B2 | 5/2007 | Vaananen |
| 7,233,655 B2 | 6/2007 | Gailey et al. |
| 7,239,338 B2 | 7/2007 | Krisbergh et al. |
| 7,251,314 B2 | 7/2007 | Huang |
| 7,254,384 B2 | 8/2007 | Gailey et al. |
| 7,272,217 B1 | 9/2007 | Kocharlakota |
| 7,277,692 B1 | 10/2007 | Jones et al. |
| 7,277,716 B2 | 10/2007 | Helferich |
| 7,280,823 B2 | 10/2007 | Ternullo et al. |
| 7,280,838 B2 | 10/2007 | Helferich |
| 7,284,033 B2 | 10/2007 | Jhanji |
| 7,286,817 B2 | 10/2007 | Provost et al. |
| 7,289,797 B2 | 10/2007 | Kato |
| 7,299,036 B2 | 11/2007 | Sanding et al. |
| 7,299,046 B1 | 11/2007 | Ozugur et al. |
| 7,317,929 B1 | 1/2008 | El-Fishawy et al. |
| 7,333,817 B2 | 2/2008 | Tsuchiyama |
| 7,353,018 B2 | 4/2008 | Mauney et al. |
| 7,403,793 B2 | 7/2008 | Mauney et al. |
| 7,433,461 B1 | 10/2008 | Bauer |
| 7,475,057 B1 | 1/2009 | Obradovich |
| 7,593,862 B2 | 9/2009 | Mankoff |
| 7,734,305 B2 | 6/2010 | Alanara et al. |
| 7,771,271 B2 | 8/2010 | Walker et al. |
| 7,818,415 B2 | 10/2010 | Jhanji |
| 7,822,823 B2 | 10/2010 | Jhanji |
| 7,983,404 B1 | 7/2011 | Croak et al. |
| RE42,927 E | 11/2011 | Want et al. |
| 8,583,139 B2 * | 11/2013 | Jung et al. .................. 455/456.1 |
| 2001/0005857 A1 | 6/2001 | Lazaridis et al. |
| 2001/0005860 A1 | 6/2001 | Lazaridis et al. |
| 2001/0005861 A1 | 6/2001 | Mousseau et al. |
| 2001/0013071 A1 | 8/2001 | Lazaridis et al. |
| 2001/0022558 A1 | 9/2001 | Karr et al. |
| 2001/0034845 A1 | 10/2001 | Brunt et al. |
| 2001/0036224 A1 | 11/2001 | Demello et al. |
| 2001/0039546 A1 * | 11/2001 | Moore et al. ..................... 707/10 |
| 2001/0048737 A1 | 12/2001 | Goldberg et al. |
| 2001/0054115 A1 | 12/2001 | Ferguson et al. |
| 2002/0012323 A1 | 1/2002 | Petite |
| 2002/0023131 A1 | 2/2002 | Wu et al. |
| 2002/0029258 A1 | 3/2002 | Mousseau et al. |
| 2002/0032658 A1 | 3/2002 | Oki et al. |
| 2002/0035687 A1 | 3/2002 | Skantze |
| 2002/0038298 A1 | 3/2002 | Kusakabe et al. |
| 2002/0039419 A1 | 4/2002 | Akimoto et al. |
| 2002/0049818 A1 | 4/2002 | Gilhuly et al. |
| 2002/0052218 A1 | 5/2002 | Rhee |
| 2002/0055924 A1 | 5/2002 | Liming |
| 2002/0065887 A1 | 5/2002 | Paik et al. |
| 2002/0065895 A1 | 5/2002 | Zhang et al. |
| 2002/0077130 A1 | 6/2002 | Owensby |
| 2002/0087645 A1 | 7/2002 | Ertugrul et al. |
| 2002/0091777 A1 | 7/2002 | Schwartz |
| 2002/0091782 A1 | 7/2002 | Benninghoff |
| 2002/0101998 A1 | 8/2002 | Wong et al. |
| 2002/0107738 A1 | 8/2002 | Beach et al. |
| 2002/0107928 A1 | 8/2002 | Chalon |
| 2002/0120696 A1 | 8/2002 | Mousseau et al. |
| 2002/0120788 A1 | 8/2002 | Wang et al. |
| 2002/0128036 A1 | 9/2002 | Yach et al. |
| 2002/0138735 A1 | 9/2002 | Felt et al. |
| 2002/0138759 A1 | 9/2002 | Dutta |
| 2002/0152123 A1 | 10/2002 | Giordano et al. |
| 2002/0156691 A1 | 10/2002 | Hughes et al. |
| 2002/0178353 A1 | 11/2002 | Graham |
| 2002/0181701 A1 | 12/2002 | Lee |
| 2002/0194281 A1 | 12/2002 | McConnell et al. |
| 2002/0194285 A1 | 12/2002 | Mousseau et al. |
| 2003/0005066 A1 | 1/2003 | Lazaridis et al. |
| 2003/0009698 A1 | 1/2003 | Lindeman et al. |
| 2003/0032476 A1 | 2/2003 | Walker et al. |
| 2003/0037261 A1 | 2/2003 | Meffert et al. |
| 2003/0048905 A1 | 3/2003 | Gehring et al. |
| 2003/0050987 A1 | 3/2003 | Lazaridis et al. |
| 2003/0055902 A1 | 3/2003 | Amir et al. |
| 2003/0061511 A1 | 3/2003 | Fischer |
| 2003/0078058 A1 | 4/2003 | Vatanen et al. |
| 2003/0081621 A1 | 5/2003 | Godfrey et al. |
| 2003/0088633 A1 | 5/2003 | Chiu et al. |
| 2003/0097361 A1 | 5/2003 | Huang et al. |
| 2003/0115448 A1 | 6/2003 | Bouchard |
| 2003/0120733 A1 | 6/2003 | Forman |
| 2003/0126216 A1 | 7/2003 | Avila et al. |
| 2003/0126220 A1 | 7/2003 | Wanless |
| 2003/0142364 A1 | 7/2003 | Goldstone |
| 2003/0146871 A1 | 8/2003 | Karr et al. |
| 2003/0182575 A1 | 9/2003 | Korfanta |
| 2003/0187938 A1 | 10/2003 | Mousseau et al. |

(56) References Cited

U.S. PATENT DOCUMENTS

| | | |
|---|---|---|
| 2003/0191808 A1 | 10/2003 | Adler et al. |
| 2003/0194990 A1 | 10/2003 | Helferich |
| 2003/0204568 A1 | 10/2003 | Bhargava et al. |
| 2003/0220979 A1 | 11/2003 | Hejl |
| 2003/0222765 A1 | 12/2003 | Curbow et al. |
| 2003/0235307 A1 | 12/2003 | Miyamoto |
| 2003/0235308 A1 | 12/2003 | Boynton et al. |
| 2003/0237082 A1 | 12/2003 | Thurlow |
| 2004/0019780 A1 | 1/2004 | Waugh et al. |
| 2004/0021889 A1 | 2/2004 | McAfee et al. |
| 2004/0024824 A1 | 2/2004 | Ferguson et al. |
| 2004/0030906 A1 | 2/2004 | Marmigere et al. |
| 2004/0052340 A1 | 3/2004 | Joffe et al. |
| 2004/0059598 A1 | 3/2004 | L. Wellons et al. |
| 2004/0059914 A1 | 3/2004 | Karaoguz |
| 2004/0060056 A1 | 3/2004 | Wellons et al. |
| 2004/0073619 A1 | 4/2004 | Gilhuly et al. |
| 2004/0078488 A1 | 4/2004 | Patrick |
| 2004/0083271 A1 | 4/2004 | Robert Tosey |
| 2004/0083365 A1 | 4/2004 | Renier et al. |
| 2004/0110515 A1 | 6/2004 | Blumberg et al. |
| 2004/0111478 A1 | 6/2004 | Gross et al. |
| 2004/0111480 A1 | 6/2004 | Yue |
| 2004/0116073 A1 | 6/2004 | Mauney et al. |
| 2004/0116119 A1 | 6/2004 | Lewis et al. |
| 2004/0122847 A1 | 6/2004 | Rodgers |
| 2004/0122905 A1 | 6/2004 | Smith et al. |
| 2004/0137884 A1 | 7/2004 | Engstrom et al. |
| 2004/0137955 A1 | 7/2004 | Engstrom et al. |
| 2004/0165727 A1 | 8/2004 | Moreh et al. |
| 2004/0185877 A1 | 9/2004 | Asthana et al. |
| 2004/0194116 A1 | 9/2004 | McKee et al. |
| 2004/0196978 A1 | 10/2004 | Godfrey et al. |
| 2004/0198348 A1 | 10/2004 | Gresham et al. |
| 2004/0199669 A1 | 10/2004 | Riggs et al. |
| 2004/0202327 A1 | 10/2004 | Little et al. |
| 2004/0203642 A1 | 10/2004 | Zatloukal et al. |
| 2004/0205106 A1 | 10/2004 | Adler et al. |
| 2004/0205248 A1 | 10/2004 | Little et al. |
| 2004/0205330 A1 | 10/2004 | Godfrey et al. |
| 2004/0208296 A1 | 10/2004 | Aboujaoude et al. |
| 2004/0212639 A1 | 10/2004 | Smoot et al. |
| 2004/0221014 A1 | 11/2004 | Tomkow |
| 2004/0221048 A1 | 11/2004 | Ogier |
| 2004/0230657 A1 | 11/2004 | Tomkow |
| 2004/0243677 A1 | 12/2004 | Curbow et al. |
| 2004/0243844 A1 | 12/2004 | Adkins |
| 2004/0243847 A1 | 12/2004 | Way |
| 2004/0249768 A1 | 12/2004 | Kontio et al. |
| 2004/0249895 A1 | 12/2004 | Way |
| 2004/0249899 A1 | 12/2004 | Shiigi |
| 2004/0252727 A1 | 12/2004 | Mousseau et al. |
| 2004/0264121 A1 | 12/2004 | Orriss |
| 2004/0266441 A1 | 12/2004 | Sinha et al. |
| 2004/0266457 A1 | 12/2004 | Dupray |
| 2005/0003809 A1 | 1/2005 | Kato |
| 2005/0009502 A1 | 1/2005 | Little et al. |
| 2005/0015455 A1 | 1/2005 | Liu |
| 2005/0019634 A1 | 1/2005 | Legg |
| 2005/0025172 A1 | 2/2005 | Frankel |
| 2005/0025291 A1 | 2/2005 | Peled et al. |
| 2005/0025297 A1 | 2/2005 | Finnigan |
| 2005/0038863 A1 | 2/2005 | Onyon et al. |
| 2005/0044160 A1 | 2/2005 | McElligott |
| 2005/0055413 A1 | 3/2005 | Keohane et al. |
| 2005/0058124 A1 | 3/2005 | Helferich |
| 2005/0058260 A1 | 3/2005 | Lasensky et al. |
| 2005/0060720 A1 | 3/2005 | Mayer |
| 2005/0076109 A1 | 4/2005 | Mathew et al. |
| 2005/0079873 A1 | 4/2005 | Caspi et al. |
| 2005/0091329 A1 | 4/2005 | Friskel |
| 2005/0099654 A1 | 5/2005 | Chen |
| 2005/0099998 A1 | 5/2005 | Semper |
| 2005/0102381 A1 | 5/2005 | Jiang et al. |
| 2005/0108336 A1 | 5/2005 | Naick et al. |
| 2005/0108359 A1 | 5/2005 | Hyder et al. |
| 2005/0114652 A1 | 5/2005 | Swedor et al. |
| 2005/0119011 A1 | 6/2005 | Sakamoto et al. |
| 2005/0130361 A1 | 6/2005 | Balasubramanian et al. |
| 2005/0132010 A1 | 6/2005 | Muller |
| 2005/0135681 A1 | 6/2005 | Schirmer |
| 2005/0137009 A1 | 6/2005 | Vetelainen |
| 2005/0138353 A1 | 6/2005 | Spies et al. |
| 2005/0141718 A1 | 6/2005 | Yu et al. |
| 2005/0148356 A1 | 7/2005 | Ferguson et al. |
| 2005/0159107 A1 | 7/2005 | Mauney et al. |
| 2005/0163320 A1 | 7/2005 | Brown et al. |
| 2005/0165740 A1 | 7/2005 | Kerr et al. |
| 2005/0176451 A1 | 8/2005 | Helferich |
| 2005/0180576 A1 | 8/2005 | Jevans |
| 2005/0188024 A1 | 8/2005 | Singer |
| 2005/0188045 A1 | 8/2005 | Katsikas |
| 2005/0198143 A1 | 9/2005 | Moody et al. |
| 2005/0198170 A1 | 9/2005 | LeMay et al. |
| 2005/0198506 A1 | 9/2005 | Qi et al. |
| 2005/0210064 A1 | 9/2005 | Caldini et al. |
| 2005/0210106 A1 | 9/2005 | Cunningham |
| 2005/0210246 A1 | 9/2005 | Faure |
| 2005/0210394 A1 | 9/2005 | Crandall et al. |
| 2005/0216587 A1 | 9/2005 | John |
| 2005/0216735 A1 | 9/2005 | Huang |
| 2005/0229258 A1 | 10/2005 | Pigin |
| 2005/0251558 A1 | 11/2005 | Zaki |
| 2005/0257057 A1 | 11/2005 | Ivanov et al. |
| 2005/0265551 A1 | 12/2005 | Hara |
| 2005/0282525 A1 | 12/2005 | Adams et al. |
| 2006/0013368 A1 | 1/2006 | LaBaw |
| 2006/0019638 A1 | 1/2006 | Chiu et al. |
| 2006/0019639 A1 | 1/2006 | Adams et al. |
| 2006/0020667 A1 | 1/2006 | Wang et al. |
| 2006/0021038 A1 | 1/2006 | Brown et al. |
| 2006/0021066 A1 | 1/2006 | Clayton et al. |
| 2006/0025158 A1 | 2/2006 | Leblanc et al. |
| 2006/0026246 A1 | 2/2006 | Fukuhara et al. |
| 2006/0029191 A1 | 2/2006 | Miller et al. |
| 2006/0041505 A1 | 2/2006 | Enyart |
| 2006/0041625 A1 | 2/2006 | Chen et al. |
| 2006/0046720 A1 | 3/2006 | Toropainen et al. |
| 2006/0046757 A1 | 3/2006 | Hoover et al. |
| 2006/0047766 A1 | 3/2006 | Spadea |
| 2006/0053202 A1 | 3/2006 | Foo et al. |
| 2006/0068768 A1 | 3/2006 | Sanding et al. |
| 2006/0069737 A1 | 3/2006 | Gilhuly et al. |
| 2006/0072761 A1 | 4/2006 | Johnson et al. |
| 2006/0074706 A1 | 4/2006 | Gilham |
| 2006/0075027 A1 | 4/2006 | Zager et al. |
| 2006/0080384 A1 | 4/2006 | Robinson et al. |
| 2006/0090065 A1 | 4/2006 | Bush et al. |
| 2006/0095510 A1 | 5/2006 | Rouse et al. |
| 2006/0101119 A1 | 5/2006 | Qureshi et al. |
| 2006/0133585 A1 | 6/2006 | Daigle et al. |
| 2006/0135128 A1 | 6/2006 | Skoog |
| 2006/0155698 A1 | 7/2006 | Vayssiere |
| 2006/0155812 A1 | 7/2006 | Looman |
| 2006/0168037 A1 | 7/2006 | Audu et al. |
| 2006/0168065 A1 | 7/2006 | Martin |
| 2006/0168072 A1 | 7/2006 | Park |
| 2006/0177015 A1 | 8/2006 | Skakkebaek et al. |
| 2006/0179056 A1 * | 8/2006 | Rosenberg ............... 707/6 |
| 2006/0182124 A1 | 8/2006 | Cole et al. |
| 2006/0187897 A1 | 8/2006 | Dabbs et al. |
| 2006/0190533 A1 | 8/2006 | Shannon et al. |
| 2006/0194572 A1 | 8/2006 | Fresonke et al. |
| 2006/0200528 A1 | 9/2006 | Pathiyal |
| 2006/0217112 A1 | 9/2006 | Mo |
| 2006/0218224 A1 | 9/2006 | Agrawal et al. |
| 2006/0218244 A1 | 9/2006 | Rasmussen et al. |
| 2006/0221916 A1 | 10/2006 | Taylor et al. |
| 2006/0224893 A1 | 10/2006 | Sales et al. |
| 2006/0230266 A1 | 10/2006 | Maes |
| 2006/0233370 A1 | 10/2006 | Jung et al. |
| 2006/0234635 A1 * | 10/2006 | Riordan et al. ............ 455/67.11 |
| 2006/0234680 A1 | 10/2006 | Doulton |
| 2006/0239424 A1 | 10/2006 | Walter |

(56) References Cited

U.S. PATENT DOCUMENTS

| | | | |
|---|---|---|---|
| 2006/0240868 A1 | 10/2006 | Kaplan et al. | |
| 2006/0247962 A1 | 11/2006 | Harvey et al. | |
| 2006/0248148 A1 | 11/2006 | Timmins et al. | |
| 2006/0259558 A1 | 11/2006 | Yen | |
| 2006/0265660 A1 | 11/2006 | Hullot et al. | |
| 2006/0270461 A1 | 11/2006 | Won et al. | |
| 2006/0276201 A1 | 12/2006 | Dupray | |
| 2006/0285533 A1 | 12/2006 | Divine et al. | |
| 2006/0286990 A1 | 12/2006 | Juan et al. | |
| 2007/0006098 A1* | 1/2007 | Krumm et al. | 715/825 |
| 2007/0030143 A1* | 2/2007 | Benson et al. | 340/508 |
| 2007/0042747 A1 | 2/2007 | Sun | |
| 2007/0063850 A1* | 3/2007 | Devaul et al. | 340/573.1 |
| 2007/0082680 A1 | 4/2007 | Fish | |
| 2007/0117541 A1 | 5/2007 | Helferich | |
| 2007/0162454 A1 | 7/2007 | D'Albora et al. | |
| 2007/0194893 A1* | 8/2007 | Deyoe | 340/436 |
| 2007/0239813 A1* | 10/2007 | Pinder et al. | 708/270 |
| 2007/0265838 A1 | 11/2007 | Chopra et al. | |
| 2007/0287473 A1 | 12/2007 | Dupray | |
| 2008/0037582 A1 | 2/2008 | Wang | |
| 2008/0039052 A1 | 2/2008 | Knowles | |
| 2009/0191848 A1 | 7/2009 | Helferich | |
| 2009/0209235 A1 | 8/2009 | Lawler et al. | |
| 2009/0234927 A1 | 9/2009 | Buzescu et al. | |

FOREIGN PATENT DOCUMENTS

| | | |
|---|---|---|
| EP | 777394 | 6/1997 |
| EP | 831664 | 9/1997 |
| EP | 0 505 489 | 11/1997 |
| EP | 0821536 | 1/1998 |
| EP | 0935378 A2 | 8/1999 |
| EP | 0 624 993 | 12/2003 |
| JP | 3/500955 | 2/1991 |
| JP | 03232325 | 10/1991 |
| JP | 6-70292 | 3/1994 |
| JP | 6-261121 | 9/1994 |
| JP | 6-276226 | 9/1994 |
| JP | 06245254 | 9/1994 |
| JP | 6/318899 | 11/1994 |
| JP | 06-326656 | 11/1994 |
| JP | 7/503826 | 4/1995 |
| JP | 7/245773 | 9/1995 |
| JP | 8-019025 | 1/1996 |
| JP | 8-97854 | 4/1996 |
| JP | 8-163637 | 6/1996 |
| JP | H8-181781 | 7/1996 |
| JP | 8/228368 | 9/1996 |
| JP | 8-265245 | 10/1996 |
| JP | 08336182 | 12/1996 |
| JP | 9-146824 | 6/1997 |
| JP | 9-200250 | 7/1997 |
| JP | 2001/517891 | 10/2001 |
| JP | 2000-513362 | 9/2005 |
| KR | 00164369 | 9/1998 |
| WO | 89/05009 | 6/1989 |
| WO | 92/14330 | 8/1992 |
| WO | WO 96/42041 | 12/1996 |
| WO | 97/08906 | 3/1997 |
| WO | WO 97/24004 A1 | 7/1997 |
| WO | 9731488 | 8/1997 |
| WO | WO 97/29597 | 8/1997 |
| WO | 97 / 32439 | 9/1997 |
| WO | 9858476 | 12/1998 |
| WO | WO 01/08059 A1 | 7/1999 |
| WO | 9965256 | 12/1999 |

OTHER PUBLICATIONS

Request for Inter Partes Reexamination of US Pat 7,155,241, claims 1, 2, 7, 10, 13, 14, 38, 39, 40, 41, 42, 47, 50, 53, 54, 71, 72, 77, 80, 84, and 85, Control No. 95/001,864, Andrea G. Reister (Dec. 29, 2011).
Non-Final Office Action in U.S. Appl. No. 13/210,223, (Dec. 26, 2012).
Response to Non-Final Office Action in U.S. Appl. No. 13/210,223 (Feb. 11, 2013).
*Helferich Patent Licensing LLC v. Suns, et al.*, Plaintiff's Response to Defendant's Initial Invalidity Contentions (Dec. 21, 2012).
Patentee Response and Request for Reconsideration of Non-Final Rejection in Inter Partes Reexamination of U.S. Pat 8,134,450, Control No. 95/002,016 (Dec. 10, 2012).
Expert Declaration of John R. Grindon, D. Sc., in Inter Partes Reexamination of U.S. Pat 8,134,450, Control No. 95/002,016 (Dec. 10, 2012).
Declaration of Leonard I. Palevsky in Inter Partes Reexamination of U.S. Pat 8,134,450, Control No. 95/002,016 (Dec. 10, 2012).
Declaration of Martin Schwartz in Inter Partes Reexamination of U.S. Pat 8,134,450, Control No. 95/002,016 (Dec. 10, 2012).
Patentee Response and Request for Reconsideration of Non-Final Rejection in Inter Partes Reexamination of U.S. Pat 8,224,294, Control No. 95/002,140 (Dec. 27, 2012).
Expert Declaration of John R. Grindon, D. Sc., in Inter Partes Reexamination of U.S. Pat 8,224,294, Control No. 95/002,140 (Dec. 27, 2012).
Declaration of Leonard I. Palevsky in Inter Partes Reexamination of U.S. Pat 8,224,294, Control No. 95/002,140 (Dec. 27, 2012).
Declaration of Martin Schwartz in Inter Partes Reexamination of U.S. Pat 8,224,294, Control No. 95/002,140 (Dec. 27, 2012).
Requester Comments in Inter Partes Reexamination of U.S. Patent No. 7,835,757, Control No. 95/001,984, Andrea G. Reister (Jan. 4, 2013).
Order in Inter Partes Review of U.S. Patent No. 7,155,241, Trial No. IPR2013-00033, Expunging Papers in Inter Partes Reexamination of U.S. Patent No. 7,155,241 (Control No. 95/002,088), Administrative Patent Judge Joni Y. Chang, (Dec. 6, 2012).
Order in Inter Partes Review of U.S. Patent No. 7,155,241, Trial No. IPR2013-00033, Denying Request to Lift the Stay in Inter Partes Reexamination of U.S. Patent No. 7,155,241 (Control No. 95/002,088), Administrative Patent Judge Joni Y. Chang, (Dec. 20, 2012).
Preliminary Patent Owner Response to the Petition for Inter Partes Review of US Pat 7,155,241, IR2013-00033 (Jan. 18, 2013).
Notice of Allowance in U.S. Appl. No. 13/109,389, (Oct. 12, 2012).
Notice of Allowance in U.S. Appl. No. 13/109,437, (Dec. 21, 2012).
Anonymous, "Active Channel Server Frequently Asked Questions (FAQ)", Microsoft Corporation, Q181161, 2006, 2 pages.
Anonymous, "Introduction to Active Channel Technology", Microsoft Corporation, 2006, 5 pages.
Engst, A.C., "The Real TidBITS Channel", TidBITS Electronic Publishing, 1998, 4 pages.
Engst, A.C., "TidBITS#349/14/Oct/96," TidBITS Electronic Publishing, 1996, 10 pages.
Form 1449, filed in Patent No. 5,438,611, Campana, Jr. et al., Issued Aug. 1, 1995, 1 page.
Gillay, C.Z., "Subscriptions, Channels, and Active Desktop", TechNotes, Franklin, Beedle & Associates, Inc., 1999, pp. 1/6.
International Preliminary Examination Report dated Jul. 10 2001 (7 pages) PCT/US00/08261 Jul. 1 2001.
Khare, R., et al., "Scenarios for an Internet/Scale Event Notification Service (ISENS)", Internet/Draft, Aug. 13, 1998, 18 pages.
PLUS Patent Linguistics Utility Search Results for S/N 10445257, Searched Mar. 16, 2005.
Siewiorek, D.P., et al., "Computer Structures: Principles and Examples", McGraw/Hill Book Company, 1982, 21 pages.
Statutory Invention Registration No. H610; Date: Mar. 7, 1989, Focarile et al.
Winnick Cluts, N., et al., "A Preview of Active Channel and the Active Desktop for Internet Explorer 4.0", Microsoft Corporation, 1997, 13 pages.
Anonymous, "Envoy Wireless Communicator User's Guide," Motorola, Inc. (1994).
Anonymous, "General Magic OS Targets US, Japan," Reed Business Information (1996).
Anonymous, "MessagePad 2000: New Newton Exceeds Expectation," TidBITS #379 (May 12, 1997).
Wireless, Business Wire (Dec. 11, 2006).

(56) References Cited

OTHER PUBLICATIONS

Anonymous, "New Features of the Newton 2.0 Operating System," Apple Computer, Inc. (1995).
Anonymous, "New RadioMail Package Brings Maximum Affordability and Simplicity to Wireless Communications," AllBusiness (Feb. 27, 1996).
Anonymous, "Newton Apple MessagePad Handbook," Apple Computer, Inc. (1995).
Anonymous, "Newton Internet Enabler," (1997).
Anonymous, "Newton MessagePad (Original) Specs," EveryMac.com (1996).
Anonymous, "RadioMail Corporation Releases Wireless Internet Access Solution for CDPD Carriers," Business Wire (Oct. 7, 1996).
Anonymous, "Using E/Mail on Your Newton Device," Apple Computer, Inc. (1997).
Denise Shelton, "RadioMail can Find, Retrieve Web Pages," CNET News (Jun. 4, 1996).
Ira Brodsky, "Instant Gratification," Telephone Online (Jan. 15, 1999).
Mark Kellner, "Earthquake and RadioMail," The Washington Times (Jan. 24, 1994).
Stuart Price, "Product Reviews: Eudora Pro for Newton 1.0," MacUser (Dec. 22, 1996).
Anonymous, "Sony Electronics Introduces Magic Link PIC/2000," BusinessWire (Oct. 30, 1995).
Micheal M. Tso, et al., "Always on, Always Connected Mobile Computing," IEEE (1996).
Anonymous, "Newton Solutions Guide," Apple Computer, Inc. (1995).
Anonymous, "Newton Messaging Card Arrives," MacWeek (Sep. 1993).
Anonymous, "Allpen's Nethopper Lets Apple Newton Owners Surf Internet, Intranets," Tribune Business News (Jun. 1996).
Anonymous, § 3.2.9 ETSI GSM 3.40, "Digital Cellular Telecommunications System (Phase 2+) Technical Realisation of the Short Message Service Point/to/Point," v4.13.0, (May 1996).
"New Wyndmail version 1.5 features another first for wireless industry," Busines Wire (Author Unknown) (Aug. 19, 1996).
Powerbook and MessagePad, Business Wire (Author Unknown) (Jan. 9, 1997).
"Notice of Grounds of Rejection," Japanese Patent App. No. 2008/302127, dated Jun. 30, 2009.
"Notice of Grounds of Rejection," Japanese Patent App. No. 2009-052858, dated Oct. 6, 2009.
Anonymous, "Second Generation Personal Handy Phone System," pp. 117-119, dated Jun. 25, 1996.
"Notice of Grounds of Rejection," Japanese Patent App. No. 2009-052859, dated Oct. 6, 2009.
Freed, Borenstein, RFC 2045, MIME format standards, Nov. 1996.
"Claim Charts Applying 5,905,777 (Foladare et al.) to Selected Claims of Helferich U.S. Patent Nos. 7,499,716, 7,280,838, and 7,155,241" (Apr. 15, 2010).
"Final Rejection," Japanes Patent App. No. 2008-302127, dated Apr. 13, 2010.
"Final Rejection," Japanes Patent App. No. 2009-052858, dated Apr. 22, 2010.
Fuhrt, Design issues for interactive television systems, Computer Magazine, May 1995.
Henriksen, Mobile Data Network System Description, Norwegian Telecommunications Administration Research Dept, Apr. 1986.
Crispin, Interactive Mail Access Protocol—Version 2, Request for Comments 1176, Network Working Group, Aug. 1990.
Kaspersen, vol. 1 Network architecture addressing and routing, Mobile Data Network Description, Teledirektoratets forskningsavdeling, Mar. 1989.
Kaspersen, vol. 2 Service and service elements, "Mobile Data Network Description", Teledirektoratets forskningsavdeling, Apr. 1989.
Kaspersen, vol. 6 Requirements to the Base Station, "Mobile Data Network Description", Teledirektoratets forskningsavdeling, Jul. 1989.
Kaspersen, vol. 7 Requirements to the Mobile Stations, "Mobile Data Network Description", Teledirektoratets forskningsavdeling, Sep. 1989.
Kramer, Use of two-way wireless messaging for personal telephone management, University of Wisconsin Record, Jun. 1905.
Anonymous, Changes from Pine 3.96 to 4.00, Computing and Networking, University of Washington, Feb. 2001.
Anonymous, Active Paper's Presto!Mail to be bundled with Envoy 150 Wireless Communicator from Motorola, Business Wire, Apr. 1996.
Crispin, Internet Message Access Protocol Version 4, Request for Comments 2060, Network Working Group, Dec. 1996.
Rodriquez, Motorola provides NetWare access to paging networks, InfoWorld, May 1995.
Joseph, Rover: a toolkit for mobile information access, SIGOPS Dec. 1995, Jan. 1900.
Hardy, SkyTel is set to launch two-way-paging—Mtel unit is poised for big gains in wireless business, Wall Street Journal, Sep. 1995.
Anonymous, Motorola unveils next-generation Tango products at PCS '96; Tanto Lite guarantees message delivery and receipt, Business Wire, Sep. 1996.
Kaspersen, vol. 3 Protocols and protocol hierarchy within the MDN, "Mobile Data Network Description", Teledirektoratets forskningsavdeling, May 1989.
Kaspersen, vol. 4 Specification of DTL and DTP within the MDN, "Mobile Data Network Description", Teledirektoratets forskningsavdeling, Jun. 1989.
Kaspersen, vol. 8 Specification of the MDN-MHS inter-working, "Mobile Data Network Description", Teledirektoratets forskningsavdeling, Aug. 1989.
Anonymous, UP Browser Manual, Unwired Planet, Aug. 1996.
Anonymous, UP HDML Language Reference, Jul. 1996.
Anonymous, UP Up.Link Developer's Guide, Jul. 1996.
Verjinkski, PHASE, a portable host access system environment, Unisys Defense Systems, Jan. 1900.
Kylanpaa, Nomadic access to information services by a GSM phone, Computer & Graphics, Jun. 1905.
Anonymous, Cost of Ownership Analysis Instructions, Unwired Planet, Jun. 2010.
Anonymous, The Mobile Intranet—wireless internet access with UP Link by Unwired Planet, Jun. 1905.
Butler, Post Office Protocol Version 2", Request for Comments 937, Network Working Group, Feb. 1985.
Taylor, Internetwork Mobility—the CDPD Approach, Jun. 1996.
Anonymous, Narrowband Sockets Specification Intel and Nokia, Sep. 1996.
deLespinasse, Rover Mosaic: E-mail communication for a full-function web browser, Master's Thesis, MIT, Jun. 1995.
"Notice of Grounds of Rejection," Japanese Patent App. No. 2010-001327, dated Aug. 17, 2010 (including English Translation).
Anonymous, Compiled Redacted Correspondence regarding Tso '327 Reference, 2010.
Comiled Plaintiff's Response to Defendant's Initial Invalidity Contentions and Defendant's Initial Invalidity Contentions exchanged in NDIL Case No. 1:10-cv-04387 (Dec. 2010).
*Helferich Patent Licensing LLC v. Suns Leagacy Partners LLC*, Defendant's Answer, Defenses, First Counterclaim, Amended Second Counterclaim, and Jury Demand, Laura E. Muschamp (Feb. 21, 2012).
*Helferich Patent Licensing LLC v. Suns Leagacy Partners LLC*, Helferich's Response to First Counterclaim, Amended Second Counterclaim by Phoenix Newspapers, Inc., Victoria Curtin (Mar. 16, 2012).
B. Pemberton, "Elm Configuration Guide (The Elm Mail System, Version 2.5)," Oct. 1, 1996.
J. Murphy, et. al, "Restaurant Marketing on the Worldwide Web," Cornell Hotel and Restaurant Administration Quarterly, pp. 61-71 (Feb. 1996).
M. Kramer, et. al, "Use of Two-way Wireless Messaging for Personal Telephone Management," Universal Personal Communications, 1993. Personal Communications: Gateway to the 21st Century, Conference Record, pp. 743-748 (Oct. 1993).

(56) References Cited

OTHER PUBLICATIONS

Non-Final Office Action in U.S. Appl. No. 12/267,436, (Feb. 17, 2011).
Final Office Action in U.S. Appl. No. 12/267,436, (Oct. 31, 2011).
Applicant's Response to Non-Final Office Action in U.S. Appl. No. 12/267,436, (May 12, 2011).
Applicant's Supplemental Amendment in U.S. Appl. No. 12/267,436, (Jun. 17, 2011).
Applicant's Response to Final Office Action in U.S. Appl. No. 12/267,436, (Feb. 13, 2012).
Applicant's Supplemental Amendment in U.S. Appl. No. 12/267,436, (Mar. 1, 2012).
Notice of Allowance in U.S. Appl. No. 12/267,436, (Mar. 15, 2012).
Request for Ex Parte Reexamination of US Pat 7,835,757, claims 1-20, Control No. 90/009,882, Andrea G. Reister (Feb. 25, 2011).
Request for Ex Parte Reexamination of US Pat 7,499,716, claims 1-18 and 21-69, Control No. 90/009,880, Andrea G. Reister (Feb. 25, 2011).
Request for Ex Parte Reexamination of US Pat 7,280,838, claims 1-96, Control No. 90/009,883, Andrea G. Reister (Feb. 25, 2011).
"Information Disclosure Statement by Applicant" filed in Reexam of US Pat 7,835,757, Andrea G. Reister (Feb. 25, 2011).
"Information Disclosure Statement by Applicant" filed in Reexam of US Pat 7,499,716, Andrea G. Reister (Feb. 25, 2011).
"Information Disclosure Statement by Applicant" filed in Reexam of US Pat 7,280,838, Andrea G. Reister (Feb. 25, 2011).
Order Granting/Denying Request for Ex Parte Reexamination of US Pat 7,835,757, claims 1-20, Control No. 90/009,882, (Mar. 25, 2011).
Order Granting/Denying Request for Ex Parte Reexamination of US Pat 7,499,716, claims 1-18 and 21-69, Control No. 90/009,880, (Mar. 25, 2011).
Notice of Failure to Comply With Ex Parte Reexamination Request Requirements (37 CFR 1.510(c)), Control No. 90/009,883 (Mar. 29, 2011).
Decision Vacating Notice of Failure to Comply (Form PTOL-2077), Control No. 90/009,883 (Apr. 6, 2011).
Thesis of A.F. deLespinasse, "Rover Mosaic: E-mail Communication for a Full-Function Web Browser," Massachusetts Institute of Technology (archived Aug. 10, 1995, in MIT Library) (hereinafter "Rover Mosaic").
A.D. Joseph et al., "Rover: A Toolkit for Mobile Information Access," Proceedings of the Fifteenth ACM Symposium on Operating Systems and Principles, Copper Mountain Resort, Colorado, pp. 156-171 (Dec. 3-6, 1995) (hereinafter Rover Toolkit).
M.M. Tso, et al. "Always on, Always Connected Mobile Computing," 1996 5th IEEE International Conference on Universal Personal Communications Record, vol. 1 of 2, Sessions 1-6, Cambridge Marriott Hotel, Cambridge, Massachusetts, pp. 918-924 (Sep. 29-Oct. 2, 1996) (hereinafter "Always on, Always Connected").
Vaudreuil, Internet Engineering Task Force Request for Comments 1911: "Voice Profile for Internet Mail," pp. 1-22 (Feb. 1996) (hereinafter "RFC 1911"); and.
Yeong, et al., Internet Engineering Task Force Request for Comments 1487: "X.500 Lightweight Directory Access Protocol," pp. 1-21 (Jul. 1993) (hereinafter "RFC 1487").
Anonymous, re Nokia 9000i Communicator, Owner's Manual 9357109 Issue 2 EN, (Jun. 7, 1998).
Anonymous, "Nokia Brings Internet Into the Wireless Age," Nokia (Sep. 19, 1996).
Christian Müller-Schloe, "Embedded Microprocessor Systems," IOS Press, (1996) at p. 165.
Anonymous, "Quick Guide for Nokia 9000/9000i/9110 Communicator GPS—SMS Application Version 1.0," Nokia Mobile Phones (1999).
Anonymous, "AT&T Wireless Service announces AT&T PocketNet Service for business," Business Wire (Feb. 10, 1997).
Anonymous, "Handheld Device Markup Language FAQ," W3C (Apr. 11, 1997).
Allaire, "The first 'Internet Phone' circa 1996," Brightcove.com (Mar. 16, 2009).

Anonymous, "Network World" at p. 10 (Jul. 15, 1996).
Anonymous, "AT&T Vu by LG User Guide," LG Electronics (2008).
Sykes, "Motorola's Tango offers wireless E-mail. (pagerlike device) (Brief Article) (Product Announcement)," InfoWorld (Aug. 26, 1996).
Order Granting/Denying Request for Inter Partes Reexamination of US Pat 7,499,716, Control No. 95/001,867, (Feb. 27, 2012).
Patentee Response and Request for Reconsideration of Non-Final Rejection in Inter Partes Reexamination of U.S. Pat 7,499,716, Control No. 95/001,867 (Apr. 27, 2012).
Pat 7,499,716, Control No. 95/001,867 (Apr. 27, 2012).
Order Granting/Denying Request for Inter Partes Reexamination of US Pat 7,155,241, Control No. 95/001,864, (Mar. 12, 2012).
Requester Comments in Inter Partes Reexamination of U.S. Patent No. 8,107,601, Control No. 95/001,991 (Feb. 13, 2013).
Requester Comments in Inter Partes Reexamination of U.S. Patent No. 8,134,450, Control No. 95/002,016 (Feb. 28, 2013).
Requester Comments in Inter Partes Reexamination of U.S. Patent No. 8,224,294, Control No. 95/002,140 (Feb. 28, 2013).
Requester Comments in Inter Partes Reexamination of U.S. Patent No. 8,116,741, Control No. 95/001,983 (Mar. 8, 2013).
Non-Final Action Closing Prosecution in Inter Partes Reexamination of U.S. Patent No. 7,499,716, Control No. 95/001,867 (Apr. 29, 2013).
Notice of Allowance in U.S. Appl. No. 13/210,223 (Mar. 19, 2013).
Non-Final Office Action in U.S. Appl. No. 13/763,970 (May 3, 2013).
Order Instituting Inter Partes Review of U.S. Patent No. 7,155,241 in IPR2013-00033 (Mar. 25, 2013).
Muller-Schloer, et al., "Embedded Microprocessor Systems," IOS Press (1996).
Engelen, Letter re: Publication Date of Muller-Schloer, et al., "Embedded Microprocessor Systems," IOS Press (1996) (Mar. 4, 2013).
*Helferich Patent Licensing LLC v. CBS Corporation, Bravo Media LLC, and G4 Media LLC,* Defendants' Invalidity and Unenforceability Contentions, (Apr. 10, 2013).
*Helferich Patent Licensing LLC v. New York Times Company,* Defendant's Invalidity and Unenforceability Contentions, (Apr. 10, 2013).
*Helferich Patent Licensing LLC v. J.C. Penney Corporation, Inc.,* Defendant's Invalidity and Unenforceability Contentions, (Apr. 10, 2013).
Nokia, "Smart Messaging Specification, Revision 1.0.0" (Sep. 15, 1997).
Nokia, "Tagged Text Markup Language" (Sep. 15, 1997).
Simila, et. al, "Providing SMS Based Mobile Office Services in New GSM Communicator," IOS Press (1996).
Borenstein, et al., "RFC 1521: MIME (Multipurpose Internet Mail Extensions) Part One: Mechanisms for Specifying and describing the Format of Internet Message Bodies" (Sep. 1993).
ETSI GSM 03.12, "European Digital Cellular Telecommunications System (Phase 2); Location Registration Procedures," (Sep. 1994).
ETSI GSM 03.38, "Digital Cellular Telecommunications System (Phase 2+); Alphabets and language-specific information," Version 5.3.0 (Jul. 1996).
ETSI GSM 09.02, "Digital Cellular Telecommunications System (Phase 2+); Mobile Application Part (MAP) specification," Version 5.3.0 (Aug. 1996).
ETSI GSM 03.03, "European Digital Cellular Telecommunications System (Phase 2); Numbering, addressing and identification," Second Edition (Mar. 1995).
ETSI GSM 03.41, "Digital Cellular Telecommunications System (Phase 2+); Technical realization of Short Message Service Cell Broadcast (SMSCB)," Version 5.0.0 (Oct. 1995).
Order Granting/Denying Request for Ex Parte Reexamination of US Pat 7,280,838, claims 1-96, Control No. 90/009,883, (Apr. 26, 2011).
Request for Inter Partes Reexamination of US Pat 8,116,741, Control No. 95/001,983, Andrea G. Reister (May 4, 2012).
Request for Inter Partes Reexamination of US Pat 7,835,757, Control No. 95/001,984, Andrea G. Reister (May 9, 2012).
Request for Inter Partes Reexamination of US Pat 8,107,601, Control No. 95/001,991, Andrea G. Reister (May 16, 2012).
Request for Inter Partes Reexamination of US Pat 7,280,838, Control No. 95/001,996, Paul Stephens (May 18, 2012).

(56) References Cited

OTHER PUBLICATIONS

Patentee Response and Request for Reconsideration of Non-Final Rejection in Inter Partes Reexamination of U.S. Pat 7,155,241, Control No. 95/001,864 (May 14, 2012).
Expert Declaration of John R. Grindon, D. Sc. In Inter Partes Reexamination of U.S. Pat 7,155,241, Control No. 95/001,864 (May 14, 2012).
Declaration of Leonard I. Palevsky in Inter Partes Reexamination of U.S. Pat 7,155,241, Control No. 95/001,864 (May 14, 2012).
Non-Final Rejection in Ex Parte Reexamination of U.S. Pat 7,835,757, Control No. 90/009,882, (Jun. 17, 2011).
Non-Final Rejection in Ex Parte Reexamination of U.S. Pat 7,499,716, Control No. 90/009,880, (Jun. 17, 2011).
Patentee Response and Request for Reconsideration of Non-Final Rejection in Ex Parte Reexamination of U.S. Pat 7,835,757, Control No. 90/009,882 (Jun. 29, 2011).
Patentee Response and Request for Reconsideration of Non-Final Rejection in Ex Parte Reexamination of U.S. Pat 7,499,716, Control No. 90/009,880 (Jun. 29, 2011).
Request for Inter Partes Reexamination of US Pat 8,134,450, Control No. 95/002,016, Andrea G. Reister (Jun. 14, 2012).
Order Granting/Denying Request for Inter Partes Reexamination of US Pat 8,116,741, Control No. 95/001,983, (Jun. 18, 2012).
Order Granting/Denying Request for Inter Partes Reexamination of US Pat 7,835,757, Control No. 95/001,984, (Aug. 3, 2012).
Order Granting/Denying Request for Inter Partes Reexamination of US Pat 8,107,601, Control No. 95/001,991, (Aug. 3, 2012).
P. Mockapetris, "RFC 883: Domain Names—Implementation and Specification," Nov. 1983.
T. Berners-Lee, "RFC 1738: Uniform Resource Locators (URL)," Dec. 1994.
R. Fielding, "RFC 1808: Relative Uniform Resource Locators," Jun. 1995.
R. Fielding, "RFC 2068: Hypertext Transfer Protocol—HTTP/1.1," Jan. 1997.
T. Berners-Lee, "RFC 2396: Uniform Resource Identifiers (URI): Generic Syntax," Aug. 1998.
Notice of Allowance in U.S. Appl. No. 12/167,971, (Aug. 4, 2011).
Notice of Allowance in U.S. Appl. No. 12/367,358, (Jul. 21, 2011).
Office Action in Ex Parte Reexamination of U.S. Pat. 7,499,716, Control No. 90/009,880, (Aug. 5, 2011).
Office Action in Ex Parte Reexamination of U.S. Pat. 7,835,757, Control No. 90/009,882, (Aug. 5, 2011).
Amendment Pursuant to 37 C.F.R. §§ 1.111 and 1.121 filed in Application No. 11/598,832 (Jun. 15, 2011).
Order Denying Request for Inter Partes Reexamination of U.S. Patent No. 7,280,838 (assigned Control No. 95/001,740) (Oct. 28, 2011).
Request for Ex Parte Reexamination of US Pat 7,835,757, claims 2-20, Control No. 95/001,739, Andrea G. Reister (Sep. 6, 2011).
Request for Ex Parte Reexamination of US Pat 7,499,716, claims 15, 17, 189, and 21-29, Control No. 95/001,738, Andrea G. Reister (Sep. 6, 2011).
Request for Ex Parte Reexamination of US Pat 7,280,838, claims 9-20, Control No. 95/001,740, Andrea G. Reister (Sep. 6, 2011).
"Information Disclosure Statement by Applicant" filed in 95/001,739 (Inter Partes Reexamination of 7,835,757) by Andrea G. Reister (Sep. 6, 2011).
"Information Disclosure Statement by Applicant" filed in 95/001,739 (Inter Partes Reexamination of 7,449,716) by Andrea G. Reister (Sep. 6, 2011).
"Information Disclosure Statement by Applicant" filed in 95/001,740 (Inter Partes Reexamination of 7,280,838) by Andrea G. Reister (Sep. 6, 2011).
Non-Final Office Action in 90/009,883 (Ex Parte Reexamination of 7,280,838) (Sep. 28, 2011).
Patentee Response After Final Office Action in 90/009,880 (Ex Parte Reexamination of 7,499,716) (Oct. 5, 2011).
Examiner Summary of Interview in 90/009,880 (Ex Parte Reexamination of 7,499,716) (Sep. 30, 2011).
Patentee Supplemental Response After Final Office Action in 90/009,880 (Ex Parte Reexamination of 7,499,716) (Oct. 13, 2011).
Notice of Intent to Issue Reexamination Certificate in 90/009,880 (Ex Parte Reexamination of 7,499,716) (Oct. 21, 2011).
Patentee Response After Final Office Action in 90/009,882 (Ex Parte Reexamination of 7,835,575) (Oct. 5, 2011).
Examiner Summary of Interview in 90/009,882 (Ex Parte Reexamination of 7,835,757) (Sep. 29, 2011).
Advisory Action in 90/009,882 (Ex Parte Reexamination of 7,835,757) (Oct. 21, 2011).
Patentee Supplemental Response After Final Office Action in 90/009,882 (Ex Parte Reexamination of 7,835,575) (Nov. 1, 2011).
3GPP TS 23.140 V6, "Multimedia Messaging Service (MMS); Functional Description, Stage 2 (Release 6)" (Mar. 2009).
Reilly, et al., "Enabling Mobile Network Manager," Computer Networks and ISDN Systems 29, 1417-1428 (1997).
T. Berners-Lee, "RFC 1945: Hypertext Transfer Protocol—HTTP/1.0," May 1996.
M. Crispin, "RFC 1730: Internet Message Access Protocol—Version 4," Dec. 1994.
N. Freed, "RFC: 2046: Multipurpose Internet Mail Extensions (MIME) Part Two: Media Types," Nov. 1996.
J. Meyers, "RFC 1939: Post Office Protocol—Version 3," May 1996.
J. Postel, "RFC 793: Transmission Control Protocol," Sep. 1981.
Nokia 9000 Communicator User's Manual, Issue 2 (1995).
Order Denying Request for Inter Partes Reexamination of U.S. Patent No. 7,499,716 (assigned Control No. 95/001,738) (Nov. 4, 2011).
Order Denying Request for Inter Partes Reexamination of U.S. Patent No. 7,835,757 (assigned Control No. 95/001,739) (Nov. 4, 2011).
Order Granting/Denying Request for Inter Partes Reexamination of U.S. Patent No. 7,280,838, Control No. 95/002,088 (Nov. 13, 2012).
Order Staying Inter Partes Reexamination of U.S. Patent No. 7,155,241 (Control No. 95/002,088) in View of Petition for Inter Partes Review of U.S. Patent No. 7,155,241, Trial No. IPR2013-00033, Administrative Patent Judge Joni Y. Chang, (Nov. 6, 2012).
Notice of Intent to Issue Reexamination Certificate ("NIRC") in Ex Parte Reexamination of 7,835,757 (Control No. 90/009,882), (Dec. 9, 2011).
Examiner's Interview summary in Ex Parte Reexamination of 7,280,838 (Control No. 90/009,883), (Dec. 13, 2011).
Patentee's Response after Non-Final Office Action in Ex Parte Reexamination of 7,280,838 (Control No. 90/009,883), (Nov. 28, 2011).
Kaashoek, M. Frans, et al., "Dynamic Documents: Mobile Wireless Access to the WWW", IEEE Computer Society (Chs. 1-3) (1995).
Chau, Jonathan, "Internet Explorer 3.0," Microsoft (Nov. 1, 1996).
Lemay, Laura, "Teach Yourself WEB Publishing with HTML in 14 days" (1996).
Wolfe, David, "Designing and Implementing Microsoft Proxy Server, Chapter 11" (1997).
McFedries, Paul, "Windows 95 Unleashed," SAMS Publishing (Ch. 32) (1996).
"GSM Originating Call Flow," EventHelix (2008).
"GSM Terminating Call Flow," EventHelix (2004).
"Eudora Mail Pro, Version 3.0 User Manual," QUALCOMM (pp. 30, 32, 50, and 53) (Jun. 1997).
Action Closing Prosecution (Non-Final) in Inter Partes Reexamination of U.S. Patent No. 8,107,601, Control No. 95/001,991 (Oct. 28, 2013).
"John C. Mitchell Deposition Transcript," Inter Partes Review of U.S. Patent No. 7,155,241 IPR2013-00033 (Ex. 2067) (Sep. 20, 2013).
"Patent Owner's Motion for Observation Regarding John Mitchell," Inter Partes Review of U.S. Patent No. 7,155,241 IPR2013-00033 (Paper 98) (Sep. 27, 2013).
"Petitioners' Response to Patent Owner's Motion for Observation Regarding John Mitchell," Inter Partes Review of U.S. Patent No. 7,155,241 IPR2013-00033 (Paper 103) (Oct. 7, 2013).
"Expert Declaration of John R. Grindon, D.Sc.," Inter Partes Review of U.S. Patent No. 7,155,241 IPR2013-00033 (Ex. 2062) (Sep. 6, 2013).
"John Grindon Deposition Transcript," Inter Partes Review of U.S. Patent No. 7,155,241 IPR2013-00033 (Ex. 2070) (Sep. 23, 2013).

(56) References Cited

OTHER PUBLICATIONS

"Petitioners' Motion for Observation Regarding John Grindon," Inter Partes Review of U.S. Patent No. 7,155,241 IPR2013-00033 (Paper 93) (Sep. 27, 2013).
"Patent Owner's Response to Petitioners' Motion for Observation Regarding John Grindon," Inter Partes Review of U.S. Patent No. 7,155,241 IPR2013-00033 (Paper 106) (Oct. 7, 2013).
"Patent Owner's Reply to Opposition to Patent Owner's Motion to Amend," Inter Partes Review of U.S. Patent No. 7,155,241 IPR2013-00033 (Paper 89) (Sep. 6, 2013).
"Webmail Brings Home 'Best of Show' Product Allows E-Mail Access from Any Computer on the World Wide Web," PRNewswire (Oct. 3, 1995).
Non-Final Action Closing Prosecution in Inter Partes Reexamination of U.S. Patent No. 8,116,741, Control No. 95/001,983 (May 31, 2013).
"Patentee Response to Action Closing Prosecution (Non-Final) Pursuant to 37 C.F.R. § 1.951(a)," Reexamination Control No. 95/001,867 (Jul. 1, 2013).
"Expert Declaration of John R. Grindon, D.Sc.," Reexamination Control No. 95/001,867 (Jul. 1, 2013).
"Expert Declaration of Bobby R. Hunt, Ph.D.," Reexamination Control No. 95/001,867 (Jul. 1, 2013).
"Declaration of Leonard I. Palevsky, Managing Member of Helferich Patent Licensing, LLC," Reexamination Control No. 95/001,867 (Jul. 31, 2013).
"Patentee Response to Action Closing Prosecution (Non-Final) Pursuant to 37 C.F.R. § 1.951(a)," Reexamination Control No. 95/001,983 (Jul. 31, 2013).
"Expert Declaration of John R. Grindon, D.Sc.," Reexamination Control No. 95/001,983 (Jul. 31, 2013).
"Expert Declaration of Bobby R. Hunt, Ph.D.," Reexamination Control No. 95/001,983 (Jul. 31, 2013).
"Declaration of Timothy D. Sperling, BSE, JD," Reexamination Control No. 95/001,983 (Jul. 31, 2013).
"Declaration of Dwight Duncan, M.S., CFA" Reexamination Control No. 95/001,983 (Jul. 31, 2013).
"Patent Owner's Amended Response under 35 U.S.C. § 316(a)(8) and 37 C.F.R. § 42.220," Inter Partes Review of U.S. Patent No. 7,155,241 IPR2013-00033 (Jun. 25, 2013).
"Patent Owner's Motion to Amend under 37 C.F.R. § 42.121," Inter Partes Review of U.S. Patent No. 7,155,241 IPR2013-00033 (Jun. 7, 2013).
Official Transcript of John C. Mitchell Cross-Examination Deposition Transcript in IPR2013-0003 (Jun. 3, 2013).
"Expert Declaration of Bobby R. Hunt, Ph.D.," Inter Partes Review of U.S. Patent No. 7,155,241 IPR2013-00033 (Jun. 7, 2013).
"Expert Declaration of John R. Grindon, D.Sc.," Inter Partes Review of U.S. Patent No. 7,155,241 IPR2013-00033 (Jun. 7, 2013).
"Supplemental Expert Declaration of John R. Grindon, D.Sc.," Inter Partes Review of U.S. Patent No. 7,155,241 IPR2013-00033 (Jun. 25, 2013).
"Petitioner's Reply to Patent Owner's Response," Inter Partes Review of U.S. Patent No. 7,155,241 IPR2013-00033 (Jul. 29, 2013).
"Petitioner's Opposition to Patent Owner's Motion to Amend," Inter Partes Review of U.S. Patent No. 7,155,241 IPR2013-00033 (Jul. 29, 2013).
"Second Declaration of John C. Mitchell, Ph.D.," Inter Partes Review of U.S. Patent No. 7,155,241 IPR2013-00033 (Jul. 29, 2013).
"John Grindon Deposition Transcript, vol. I," Inter Partes Review of U.S. Patent No. 7,155,241 IPR2013-00033 (Jul. 17, 2013).
"John Grindon Deposition Transcript, vol. II," Inter Partes Review of U.S. Patent No. 7,155,241 IPR2013-00033 (Jul. 18, 2013).
"Richard Helferich Deposition Transcript, vol. I," Inter Partes Review of U.S. Patent No. 7,155,241 IPR2013-00033 (Jul. 15, 2013).
"Richard Helferich Deposition Transcript, vol. II," Inter Partes Review of U.S. Patent No. 7,155,241 IPR2013-00033 (Jul. 16, 2013).
Microsoft Press Computer Dictionary, pp. 236-237, 240, 285, 487 (3d ed. 1997).
RFC 1081: Post Office Protocol—Version 3 (Nov. 1988).
RFC 1738: Uniform Resource Locators (URL), Dec. 1994.
*Helferich Patent Licensing LLC* v. *CBS Corporation, Bravo Media LLC, and G4 Media LLC,* Defendants' Invalidity and Unenforceability Contentions, (Jun. 7, 2013).
*Helferich Patent Licensing LLC* v. *New York Times Company,* Defendant's Invalidity and Unenforceability Contentions, (Jun. 7, 2013).
*Helferich Patent Licensing LLC* v. *J.C. Penney Corporation, Inc.,* Defendant's Invalidity and Unenforceability Contentions, (Jun. 7, 2013).
*Helferich Patent Licensing LLC* v. *CBS Corporation, Bravo Media LLC, and G4 Media LLC,* Defendants' Invalidity and Unenforceability Contentions, (Jun. 21, 2013).
*Helferich Patent Licensing LLC* v. *New York Times Company,* Defendant's Invalidity and Unenforceability Contentions, (Jun. 21, 2013).
*Helferich Patent Licensing LLC* v. *J.C. Penney Corporation, Inc.,* Defendant's Invalidity and Unenforceability Contentions, (Jun. 21, 2013).
*Helferich Patent Licensing LLC* v. *CBS Corporation, Bravo Media LLC, and G4 Media LLC,* Plaintiff's Responsive Validity and Enforceability Contentions, (Jul. 19, 2013).
*Helferich Patent Licensing LLC* v. *New York Times Company,* Plaintiff's Responsive Validity and Enforceability Contentions, (Jul. 19, 2013).
*Helferich Patent Licensing LLC* v. *J.C. Penney Corporation, Inc.,* Plaintiff's Responsive Validity and Enforceability Contentions, (Jul. 19, 2013).
Non-Final Office Action in U.S. Appl. No. 13/895,226, (Apr. 11, 2014).
Final Written Decision, Inter Partes Review of U.S. Patent No. 7,155,241 IPR2013-00033 (Paper 122) (Mar. 3, 2014).
Right of Appeal Notice in Inter Partes Reexamination of U.S. Patent No. 7,499,716, Control No. 95/001,867 (Mar. 27, 2014).
Action Closing Prosecution (Non-Final) in Inter Partes Reexamination of U.S. Patent No. 8,107,601, Control No. 95/001,991 (Apr. 1, 2014).
Petition Under 37 C.F.R. § 1.181(a)(3) for Supervisory Review of Decision on Requesters' 37 C.F.R. § 1.181(a)(1) Petition to Vacate the ACP and Reverse Entry of Patent Owner's Supplemental Responses, Control No. 95/001,991 (Apr. 10, 2014).
Ald, et al., Algorithms and Data Structures: 4th International Workshop, Wads '95, Kingston, Canada, Aug. 16-18, 1995: Proceedings (Lecture Notes in Computer Science), Springer (Dec. 1995).
Dehne, et al., Algorithms and Data Structures: 6th International Workshop, WADS'99 Vancouver, Canada, Aug. 11-14, 1999 Proceedings (Lecture Notes in Computer Science), Springer, 1 edition (Aug. 27, 1999).
Mehlhorn, Kurt, Data Structures and Algorithms 1: Sorting and Searching (Lecture Notes in Computer Science), Springer-Verlag, 1 edition (Sep. 15, 1987).
IEEE 1998 Position Location and Navigation Symposium (Cat. No. 98CH36153), Position Location and Navigation Symposium, IEEE 1998 (Apr. 20-23, 1998).
IEEE 2000 Position Location and Navigation Symposium (Cat. No. 00CH37062), Position Location and Navigation Symposium, IEEE 2000 (Mar. 13-16, 2000).
Daly, P., Naystar GPS and GLONASS: global satellite navigation systems, Electronics & Communication Engineering Journal, vol. 5, Issue 6, pp. 349-357 (Dec. 1993).
Oman, H., Position, Location and Navigation Symposium '94, Aerospace and Electronic Systems Magazine, IEEE, vol. 9, Issue 7, pp. 2-5 (Jul. 1994).
Position, Location and Navigation Symposium '96 (Proceedings), IEEE (Apr. 22-26, 1996).
DBDAY, Halfbakery gps alarm watch (Mar. 2, 2000).
Brown, P.J., The Stick-E Document: A Framework for Creating Context-Aware Applications, Electronic Publishing, vol. 8(2 & 3) (1996).
IBM Technical Disclosure Bulletin, Automated Configuration for Country Specific Software Packages, vol. 36, Issue 36, pp. 379-380 (Oct. 1, 1993).
Fanty, et al., City Name Recognition Over the Telephone, Center for Spoken Language Understanding, Oregon Graduate Institute of Science and Technology, IEEE, pp. 1549-1552 (Apr. 27, 1993).

(56) References Cited

OTHER PUBLICATIONS

Rumelhart, et al., Parallel Distributed Processing, Explorations in the Microstructure of Cognition, Chapter 8: Learning Internal Representations by Error Propagation, vol. 1, pp. 318-362 (1986).
Rosenberg, et al., The Bell System Technical Journal, Automatic Recognition of Spoken Spelled Names for Obtaining Directory Listings, pp. 1797-1823 (Oct. 1979).
Rabiner, et al., The Bell System Technical Journal, Application of Isolated Word Recognition to a Voice Controlled Repertory Dialer System, pp. 1153-1163 (Sep. 1980).
Bell Atlantic Nynex Mobile Debuts Unique Voice Dialing Service, Talkdial, Bell Atlantic News Release (Feb. 15, 1996).
Meyers, Jason, Telephony, Wireless Nation (Mar. 4, 1996).
Alleven, Monica, Wireless Week, Potential Investors Lured by Demo (Jun. 24, 1996).
Borovoy, et al., Meme Tags and Community Mirrors: Moving from Conferences to Collaboration, ACM Conference on Computer Supported Cooperative Work (1998).
Klandrud, et al., Beacon Control of Radio Transmitters to Reduce Radio Frequency Interference, Motorola's Technical Developments, vol. 16 (Aug. 1992).
Davidson, et al., Voice Over IP Fundamentals, Cisco Press (Mar. 2000).
Petition under 37 C.F.R. §1.183 to Stay Proceeding Pursuant to 5 U.S.C.§ 705 Pending Parallel Action under the APA, U.S. Patent No. 8,107,601, Control No. 95/001,991 (May 20, 2014).
Opposition to Patent Owner's Petition under 37 C.F.R. §1.183 to Stay Proceeding Pursuant to 5 U.S.C.§ 705 Pending Parallel Action under the APA, U.S. Patent No. 8,107,601, Control No. 95/001,991 (Jun. 3, 2014).
"Declaration of John R. Grindon D.Sc.," in Inter Partes Reexamination of U.S. Patent No. 8,107,601, Control No. 95/001,991 (Jun. 2, 2014).
"Declaration of Martin Zoltick" in Inter Partes Reexamination of U.S. Patent No. 8,107,601, Control No. 95/001,991 (Feb. 3, 2014).
"Declaration of Martin A. Schwartz" in Inter Partes Reexamination of U.S. Patent No. 8,107,601, Control No. 95/001,991 (Jul. 8, 2013).
"Declaration of Richard J. Helferich" and Supporting Exhibits 1-33 in Inter Partes Reexamination of U.S. Patent No. 8,107,601, Control No. 95/001,991 (May 29, 2014).
Request for Reconsideration after Non-Final Office Action Pursuant to 37 C.F.R. § 1.111 & 1.945, U.S. Patent No. 8,107,601, Control No. 95/001,991 (Jun. 2, 2014).
Decision on Patent Owner Petition under 37 C.F.R. §1.183(a)(3) for Relief from Aug. 30, 2012 Decision, U.S. Patent No. 8,107,601, Control No. 95/001,991 (Apr. 30, 2014).
Miscellaneous Action in U.S. Patent No. 8,107,601, Control No. 95/001,991 (Apr. 29, 2014).
Decision on Patent Owner Petition under 37 C.F.R. §1.182 and 1.183 to Continue Reexamination and Consider Patent Owner's Amendment After RAN, in Inter Partes Reexamination of U.S. Patent No. 7,499,716, Control No. 95/001,867 (Jun. 24, 2014).
Petition under 37 C.F.R. §1.182 and 1.183 to Continue Reexamination and Consider Patent Owner's Amendment After RAN (including exhibits 1-3), in Inter Partes Reexamination of U.S. Patent No. 7,499,716, Control No. 95/001,867 (May 14, 2014).
Right of Appeal Notice 37 C.F.R. 1.953 in Inter Partes Reexamination of Patent No. 8,116,741, Control No. 95/001,983 (May 21, 2014).
Petition under 37 C.F.R. §1.182 to Continue Reexamination in Inter Partes Reexamination of Patent No. 8,116,741, Control No. 95/001,983 (Jun. 20, 2014).
Requester Comments in Inter Partes Reexamination of U.S. Patent No. 8,134,450 Control No. 95/002,016 (May 30, 2014).
Requester Comments in Inter Partes Reexamination of U.S. Patent No. 7,835,757, Control No. 95/001,984 (May 30, 2014).
Requester Comments in Inter Partes Reexamination of U.S. Patent No. 8,224,294 Control No. 95/002,140 (May 30, 2014).
Applicant's Supplemental Preliminary Amendment in U.S. Appl. No. 14/225,727 (Jun. 3, 2014).

Oral Hearing Transcript, Inter Partes Review of U.S. Patent No. 7,155,241 IPR2013-00033 (Paper 121) (Oct. 23, 2013).
Action Closing Prosecution (Non-Final) in Inter Partes Reexamination of U.S. Patent No. 8,134,450, Control No. 95/002,016 (Dec. 3, 2013).
Action Closing Prosecution (Non-Final) in Inter Partes Reexamination of U.S. Patent No. 8,224,294, Control No. 95/002,140 (Dec. 4, 2013).
Action Closing Prosecution (Non-Final) in Inter Partes Reexamination of U.S. Patent No. 7,835,757, Control No. 95/001,984 (Dec. 4, 2013).
PO's Response to Action Closing Prosecution (Non-Final) in Inter Partes Reexamination of U.S. Patent No. 8,134,450, Control No. 95/002,016 (Feb. 3, 2014).
"Declaration of Martin Zoltick" in Inter Partes Reexamination of U.S. Patent No. 8,134,450, Control No. 95/002,016 (Feb. 3, 2014).
PO's Response to Action Closing Prosecution (Non-Final) in Inter Partes Reexamination of U.S. Patent No. 8,224,294, Control No. 95/002,140 (Feb. 4, 2014).
"Declaration of Martin Zoltick" in Inter Partes Reexamination of U.S. Patent No. 8,224,294, Control No. 95/002,140 (Feb. 4, 2014).
PO's Response to Action Closing Prosecution (Non-Final) in Inter Partes Reexamination of U.S. Patent No. 7,835,757, Control No. 95/001,984 (Feb. 4, 2014).
"Declaration of Martin Zoltick" in Inter Partes Reexamination of U.S. Patent No. 7,835,757, Control No. 95/001,984 (Feb. 4, 2014).
Requester Comments after Action Closing Prosecution (Non-Final) in Inter Partes Reexamination of U.S. Patent No. 8,116,741, Control No. 95/001,983 (Feb. 7, 2014).
Patent Owner Notice of Appeal in Inter Partes Reexamination of Patent No. 7,835,757, Control No. 95/001,984 (Dec. 19, 2014).
Patent Owner Appeal Brief in Inter Partes Reexamination of U.S. Patent No. 7,499,716, Control No. 95/001,867 (Jan. 7, 2015).
Patent Owner Appeal Brief in Inter Partes Reexamination of U.S. Patent No. 7,835,757, Control No. 95/001,984 (Feb. 19, 2015).
Patent Owner Rebuttal Brief in Inter Partes Reexamination of U.S. Patent No. 8,116,741, Control No. 95/001,983 (Feb. 23, 2015).
Respondent's Brief in Inter Partes Reexamination of Patent No. 8,224,294, Control No. 95/002,140 (Dec. 19, 2014).
Respondent's Brief in Inter Partes Reexamination of U.S. Patent No. 7,499,716, Control No. 95/001,867 (Feb. 6, 2015).
Respondent's Brief in Inter Partes Reexamination of U.S. Patent No. 7,835,757, Control No. 95/001,984 (Mar. 19, 2015).
Order Granting Petition to Continue Reexamination in Inter Partes Reexamination of Patent No. 8,134,450, Control No. 95/002,016 (Mar. 3, 2015).
Examiner's Answer in Inter Partes Reexamination of U.S. Patent No. 8,116,741, Control No. 95/001,983 (Jan. 23, 2015).
Examiner's Answer in Inter Partes Reexamination of U.S. Patent No. 7,499,716, Control No. 95/001,867 (Feb. 27, 2015).
Examiner's Answer in Inter Partes Reexamination of U.S. Patent No. 8,224,294, Control No. 95/002,140 (Mar. 13, 2015).
Reply Brief for Appellant, *Helferich v. Lee,* Case No. 2014-1556 (Fed. Cir) (Appeal of IPR No. 2013-00033) (Dec. 15, 2014).
Brief for Defendants-Appellees, *Helferich v. New York Times Company,* Case No. 14-1196-CC (Fed. Cir) (Appeal of Case No. 1:10-cv-04387 (N.D. Ill.)) (Jun. 23, 2014).
Order Denying Plaintiff's Motion for Summary Judgment and Granting Defendant's Motion to Dismiss, *Helferich v. Lee,* Case No. 2:14 cv-0105-SRB (D. Ariz.) (Dec. 30, 2014).
Office Action in Canadian Application No. 2,659,079 (Oct. 27, 2014).
File History of U.S. Patent No. 5,974,451 to Simmons.
Patent Owner Rebuttal Brief in Inter Partes Reexamination of U.S. Patent No. 7,499,716, Control No. 95/001,867 (Mar. 27, 2015).
Patent Owner Rebuttal Brief in Inter Partes Reexamination of U.S. Patent No. 8,224,294, Control No. 95/002,140 (Apr. 13, 2015).
Requester Comments After ACP in Inter Partes Reexamination of U.S. Patent No. 8,134,450, Control No. 95/002,016 (Mar. 27, 2015).
Notification of Defective Requester Comments in Inter Partes Reexamination of Patent No. 8,107,601, Control No. 95/001,991 (Apr. 10, 2015).

(56) References Cited

OTHER PUBLICATIONS

Order Lifting Stay in Inter Partes Reexamination of Patent No. 7,155,241, Control No. 95/001,864 (Apr. 13, 2015).
Order Affirming Decision Under Fed. Cir. Rule 36, *Helferich* v. *Lee*, Case No. 2014-1556 (Fed. Cir) (Appeal of IPR No. 2013-00033) (Apr. 8, 2015).
Notice of Continued Prosecution in Related Continuation Application in U.S. Appl. No. 13/895,226 (Apr. 9, 2015).
Identification of postal items—Part C: 13 character identifier for special letter products, Universal Postal Union (2015).
Right of Appeal Notice in Inter Partes Reexamination of Patent No. 8,224,294, Control No. 95/002,140 (Aug. 25, 2014).
Patent Owner Notice of Appeal in Inter Partes Reexamination of Patent No. 8,224,294, Control No. 95/002,140 (Sep. 24, 2014).
Requester Comments after NFOA in Inter Partes Reexamination of U.S. Patent No. 8,107,601, Control No. 95/001,991 (Jul. 11, 2014).
"Declaration of John C. Mitchell, Ph.D," in Inter Partes Reexamination of U.S. Patent No. 8,107,601, Control No. 95/001,991 (Jul. 10, 2014).
Patent Owner Petition to Strike Requester Comments after NFOA in Inter Partes Reexamination of U.S. Patent No. 8,107,601, Control No. 95/001,991 (Aug. 22, 2014).
Patent Owner Supplemental Response in Inter Partes Reexamination of U.S. Patent No. 8,107,601, Control No. 95/001,991 (Aug. 22, 2014).
Requester Supplemental Response in Inter Partes Reexamination of U.S. Patent No. 8,107,601, Control No. 95/001,991 (Sep. 16, 2014).
Scan of CD Case titled "Sixth International World Wide Web Conference Proceedings" (date unknown).
Notice of Defective Notice of Appeal in Inter Partes Reexamination of U.S. Patent No. 8,116,741, Control No. 95/001,983 (Jul. 21, 2014).
Order Dismissing Petition to Continue Reexam in Inter Partes Reexamination of U.S. Patent No. 8,116,741, Control No. 95/001,983 (Aug. 19, 2014).
Patent Owner Appeal Brief in Inter Partes Reexamination of U.S. Patent No. 8,116,741, Control No. 95/001,983 (Oct. 9, 2014).
Patent Owner Petition Continue Reexam Inter Partes Reexamination of U.S. Patent No. 8,116,741, Control No. 95/001,983 (Jun. 20, 2014).
Requesters Notice of Appeal Inter Partes Reexamination of U.S. Patent No. 8,116,741, Control No. 95/001,983 (Jun. 23, 2014).
Requester Comments Under 37 C.F.R. § 1.951 in Inter Partes Reexamination of U.S. Patent No. 7,499,716, Control No. 95/001,867 (Jul. 22, 2014).
Notice of Defective Notice of Appeal in Inter Partes Reexamination of U.S. Patent No. 7,499,716, Control No. 95/001,867 (Jun. 20, 2014).
Right of Appeal Notice in Inter Partes Reexamination of U.S. Patent No. 7,499,716, Control No. 95/001,867 (Oct. 9, 2014).
Right of Appeal Notice in Inter Partes Reexamination of U.S. Patent No. 8,134,450, Control No. 95/002,016 (Oct. 31, 2014).
Requester Response Brief in Inter Partes Reexamination of U.S. Patent No. 8,116,741, Control No. 95/001,983 (Nov. 7, 2014).
Patent Owner Notice of Appeal in Inter Partes Reexamination of U.S. Patent No. 7,499,716, Control No. 95/001,867 (Nov. 7, 2014).
Patent Owner Appeal Brief in Inter Partes Reexamination of Patent No. 8,224,294, Control No. 95/002,140 (Nov. 24, 2014).
Patent Owner Notice of Appeal in Inter Partes Reexamination of Patent No. 8,134,450, Control No. 95/002,016 (Dec. 1, 2014).
Patent Owner Petition to Continue Reexam in Inter Partes Reexamination of Patent No. 8,134,450, Control No. 95/002,016 (Dec. 1, 2014).
Right of Appeal Notice in Inter Partes Reexamination of Patent No. 7,835,757, Control No. 95/001,984 (Nov. 20, 2014).
Brief for Appellant, *Helferich* v. *Lee,* Case No. 2014-1556 (Fed. Cir) (Appeal of IPR No. 2013-00033) (Sep. 16, 2014).
Plaintiff's Motion for Summary Judgment, *Helferich* v. *Lee,* Case No. 2:14 cv-0105-SRB (D. Ariz.) (Jul. 29, 2014).
Defendant's Motion to Dismiss, *Helferich* v. *Lee,* Case No. 2:14 cv-0105-SRB (D. Ariz.) (Aug. 15, 2014).
Plaintiffs Response in Opposition to Defendant's Motion to Dismiss, *Helferich* v. *Lee,* Case No. 2:14 cv-0105-SRB (D. Ariz.) (Sep. 2, 2014).
Defendant's Response in Opposition to Plaintiff's Motion for Summary Judgment, *Helferich* v. *Lee,* Case No. 2:14 cv-0105-SRB (D. Ariz.) (Sep. 5, 2014).
Plaintiff's Reply in Support of Plaintiff's Motion for Summary Judgment, *Helferich* v. *Lee,* Case No. 2:14 cv-0105-SRB (D. Ariz.) (Sep. 23, 2014).
Defendant's Reply in Support of Defendant's Motion to Dismiss, *Helferich* v. *Lee,* Case No. 2:14 cv-0105-SRB (D. Ariz.) (Sep. 22, 2014).
Brief for Plaintiff-Appellant Helferich Patent Licensing, *Helferich* v. *New York Times Company,* Case No. 14-1196-CC (Fed. Cir) (Appeal of Case No. 1:10-cv-04387 (N.D. Ill.)) (Apr. 7, 2014).
Reply Brief for Plaintiff-Appellant Helferich Patent Licensing, LLC, *Helferich* v. *New York Times Company,* Case No. 14-1196-CC (Fed. Cir) (Appeal of Case No. 1:10-cv-04387 (N.D. Ill.)) (Jul. 24, 2014).
Brief for Appellee, *Helferich* v. *Lee,* Case No. 2014-1556 (Fed. Cir) (Appeal of IPR No. 2013-00033) (Nov. 17, 2014).
Brief for Intervenor, *Helferich* v. *Lee,* Case No. 2014-1556 (Fed. Cir) (Appeal of IPR No. 2013-00033) (Nov. 17, 2014).
Response to Non-Final Office Action in U.S. Appl. No. 13/895,226 (Oct. 9, 2014).
Notice of Non-Compliant Amendment in U.S. Appl. No. 13/895,226 (Nov. 10, 2014).
Summons to Attend Oral Proceedings in EP Application No. 10181938.1 to Helferich (Mar. 11, 2014).
Hearing Transcript, *Helferich* v. *Lee,* Case No. 2:14 cv-0105-SRB (D. Ariz.) (Nov. 10, 2014).

* cited by examiner

SYSTEMS AND METHODS PROVIDING ADVERTISEMENTS TO A CELL PHONE BASED ON LOCATION AND EXTERNAL TEMPERATURE

This application is a division of application Ser. No. 11/598,202, filed Nov. 13, 2006 (now U.S. Pat. No. 8,107,601), which is a continuation of U.S. application Ser. No. 10/445,257, filed May 27, 2003 (now Abandoned), which is a continuation of U.S. application Ser. No. 09/540,490, filed Mar. 31, 2000 (now Issued as U.S. Pat. No. 6,636,733), and which is a continuation-in-part of U.S. application Ser. No. 09/408,841, filed Sep. 30, 1999 (now Issued as U.S. Pat. No. 6,826,407), which claims the benefit of U.S. Provisional Application No. 60/155,055, filed Sep. 21, 1999 and U.S. Provisional Application No. 60/126,939, filed Mar. 29, 1999; this application is also a continuation-in-part of U.S. application Ser. No. 08/934,143, filed Sep. 19, 1997 (now Issued as U.S. Pat. No. 6,233,430), U.S. application Ser. No. 08/933,344, filed Sep. 19, 1997 (now Issued as U.S. Pat. No. 6,253,061), U.S. application Ser. No. 08/934,132, filed Sep. 19, 1997 (now Issued as U.S. Pat. No. 6,087,956), U.S. application Ser. No. 08/934,337, filed Sep. 19, 1997 (now Issued as U.S. Pat. No. 6,259,892), and U.S. application Ser. No. 08/989,874, filed Dec. 12, 1997 (now Issued as U.S. Pat. No. 6,097,941). All of the above mentioned applications (provisional and non-provisional) are incorporated in their entirety herein by this reference.

BACKGROUND OF THE INVENTION

The present invention relates to wireless messaging devices such as two-way pagers, wireless telephones and personal digital assistants (PDA's) and, electronic media systems such as, electronic mail systems, electronic commerce systems and storage and retrieval systems. More specifically, the present invention relates to two-way wireless email devices and associated systems.

SUMMARY OF THE INVENTION

An object of the invention is to provide a messaging system for selectively performing an action on information, for remote retrieval of messages, for performing action on information at different times, for selective paging, for providing a user interface for message access and having integrated audio visual messaging.

Another object of the invention is to provide a method and system for wireless retrieval of an email attachment such as an audio or video file.

Another object of the invention is to provide a system for allowing a wireless device to retrieve a portion of or an entire email from one or a plurality of email systems.

It is yet another object of the invention to provide direct access to one specific or a plurality of specific email messages without having to retrieve or access other email messages.

Another object of the invention is to provide a messaging system that delivers messages or message notifications to a specific device, based on a variable such as: the "presence" of the user (i.e., whether the user has turned on his/her device), the location of the device, the device being accessed, the importance level of the message, the type of message, the time or date, the weather, a user action, or a user request.

It is still another object of the invention to provide automatic identification of a wireless mobile phone user or wireless email device and a mobile phone user's reply email message destination by utilizing a phone number or code.

It is yet another object of the invention to provide an improved method for memory management in a messaging device.

BRIEF DESCRIPTION OF THE DRAWINGS

The accompanying drawings and above identified pending patent applications, which are incorporated herein, form a part of this specification together with this description and serve to explain the principles of the invention and to enable a person skilled in the pertinent art to make and use the invention.

DESCRIPTION OF THE INVENTION

For the purpose of illustration only, a wireless mobile telephone will be used as an exemplary wireless messaging device. However, it should be understood that other messaging devices, such as pagers, wireless PDA's and the like, are also contemplated. A wireless mobile telephone, hereinafter mobile phone, is configured to receive text messages and message alerts. The mobile phone may be configured to receive Short Messaging Service (SMS) email messages or the mobile phone may have a Web Browser for accessing an Internet based email service. An email server receives an email message intended for a specific mobile telephone. An email message includes a message body and a message header. The message header usually includes various fields, such as a To field, a From field, and a Subject field. The message header also may include a Message Type field and other information common in email messages.

The email server assigns a message identifier (ID) to the message and, in one embodiment, forwards the entire message and the message ID to a mobile system for transmission to the targeted mobile phone. Alternatively, the email server may send to the mobile system just an alert, the. From field, and/or the Subject field, but not the entire message. Depending on what was transmitted to the mobile system, the mobile phone user may read the entire message, read whom the message was from, read the message subject or read the message ID.

Whether the entire message or just part of the message header was transmitted to the mobile phone, the mobile phone user may choose to reply to the message. To reply to the message, the user may simply press a button to automatically transmit to the mobile system information that identifies the mobile phone user and the message to which the user is replying. The mobile phone user may be identified by the mobile phone's mobile identification number (MIN) or by data associated with the received message, such as the message ID described above. Similarly, the message to which the user is replying may be identified by the message ID. In one embodiment, the message ID is a reply code (i.e., a short string of letters and/or numbers, such as 1234). Alternatively, the message ID is a telephone number (or pseudo telephone number) that is associated with a message processing system. For example, the email server may assign a callback telephone number to a specific message. Upon receiving the message and callback number, the mobile phone user may simply activate the reply mode causing the callback number to be transmitted for identifying the mobile phone user and or the specific message being replied to.

Figure 1:
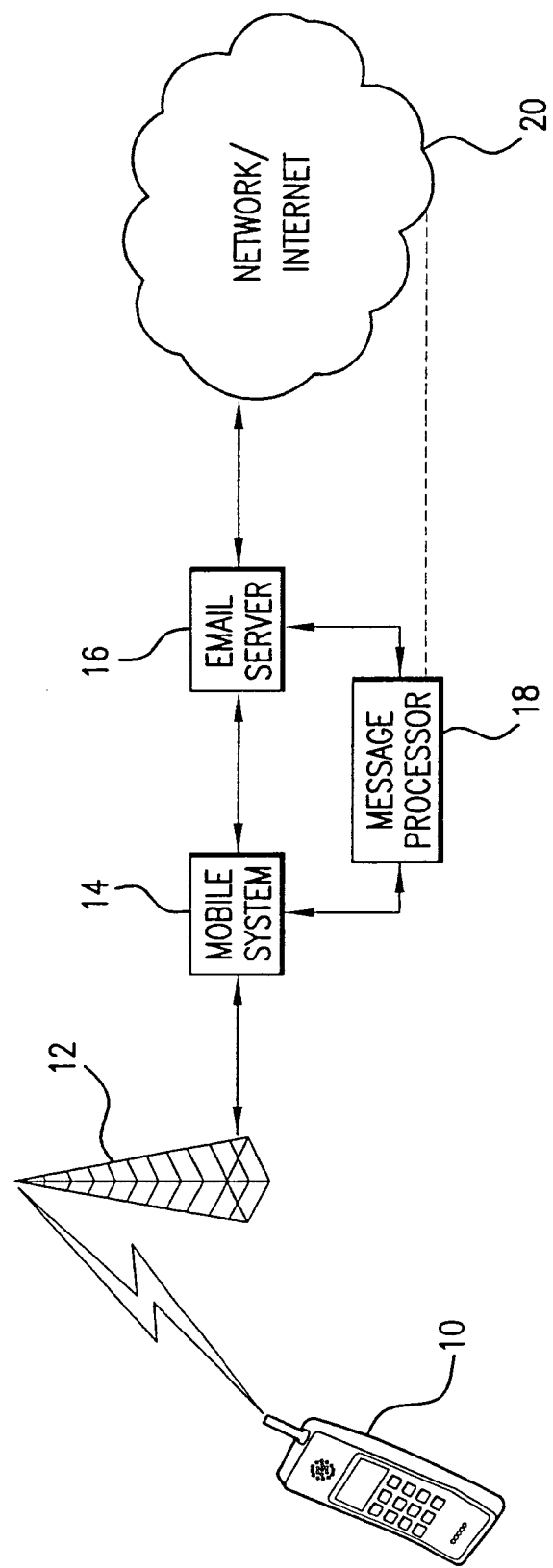
FIG. 1 is a block diagram of a wireless messaging system.
Figure 2A:
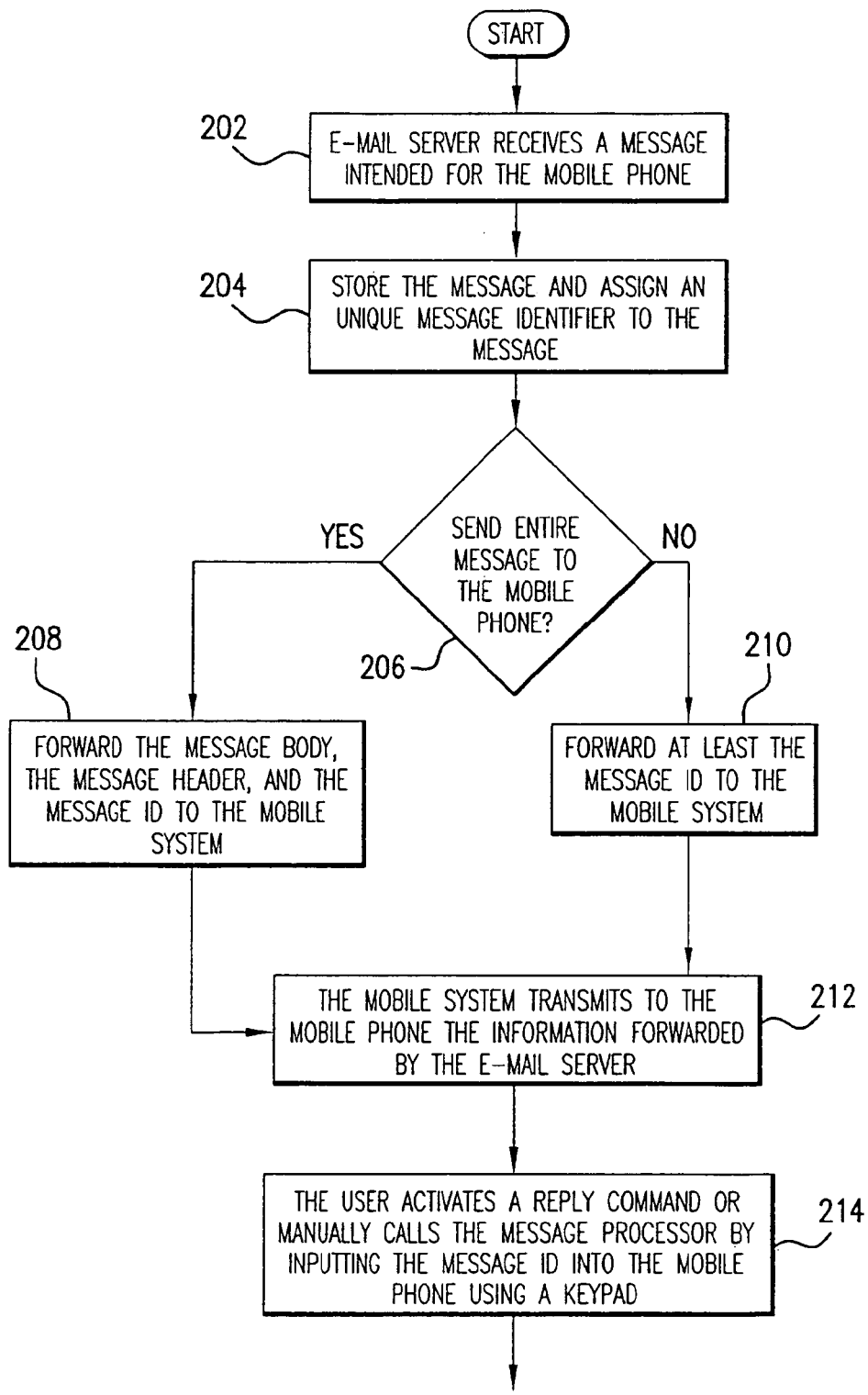
FIGS. 2A and 2B is a flowchart illustrating a process of replying to a message.
Figure 2B:
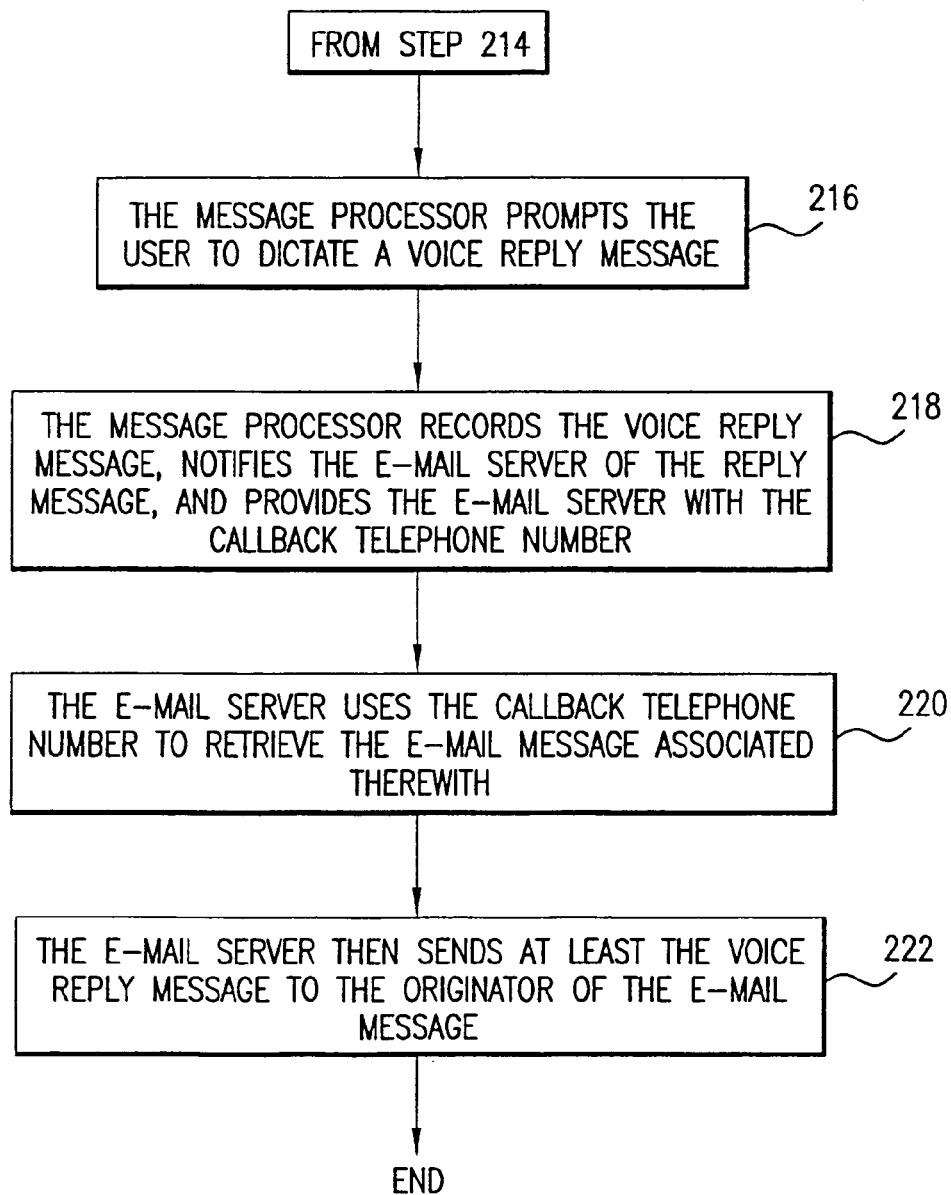
Figure 3:
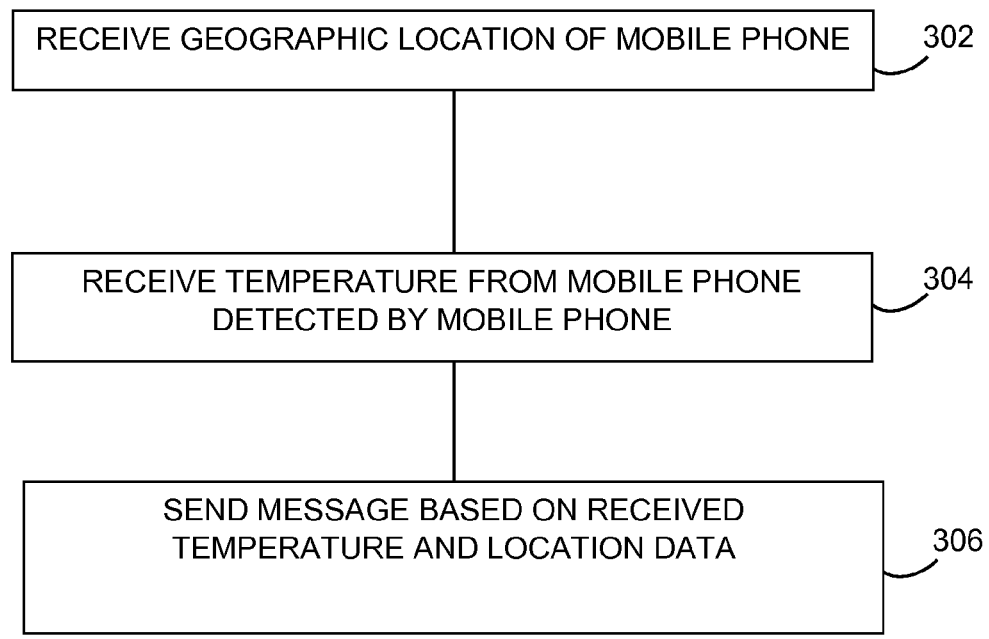
FIG. 3 depicts sending information to a cell phone based on received location and temperature data.

FIG. 1 illustrates the messaging system 100 described above and FIGS. 2A and 2B illustrate the steps performed by the components of system 100 when a mobile phone 10 user replies to an email message with a voice message. First, the email server 16 receives the email message from the Internet 20 or from another source (step 202). The email server 16 stores the message and assigns a message identifier (ID) to the email message (step 204). The message ID may take any number of forms as previously described but for the purpose of example, the email server assigns to the message a telephone callback number (e.g., 202-555-1212) or pseudo telephone number (e.g., #71 or #112).

Next, the email server 16 determines whether it should send to the mobile phone 10 the entire email message or just part of the message (for example, one or more fields of the message header) (step 206). This determination can be based on a user profile that is stored at the email server 16, or maybe specified by the user for one or a particular group of email messages. Thus, some users may create a profile that specifies that they want to receive the entire message, whereas other users can specify that they don't want to receive the entire message and can specify which portions of the message they do want to receive. If the entire message should be sent, then the entire message plus the callback number generated in step 204 is forwarded to the mobile system 14 (step 208). If the entire message should not be sent, then the email server 16 forwards, at the least, the callback number generated in step-204 to the mobile system 14 (step 210). The mobile system 14 comprises a message center, a call switching center, and transceiver circuitry necessary for transmitting information to the antenna 12 and the mobile phone 10. The mobile system 14 then transmits to the mobile phone 10 the information forwarded by the email server 16 (step 212).

Upon receiving at the mobile phone 10 the information forwarded by the email server 16, which at the least includes a callback number, the user may choose to send a reply message to the originator of the email message (step 214). The user can accomplish this by activating a reply command. Upon activating the reply command, the mobile phone automatically places a call to the callback number. Alternatively, instead of activating the reply command, the user may manually call the callback number by entering the callback number using a keypad on the mobile phone 10, or by speaking the callback number into the receiver of the mobile phone 10.

In one embodiment, all of the callback numbers generated by the email server are associated with message processor 18, thus upon placing the call to the callback number, the mobile system 14 routes the call to the message processor 18, which then answers the call. The message processor 18 may comprise a voice store and forward system for receiving voice and forwarding voice messages. Voice store and forward systems are readily available and are commonly configured to communicate with networked systems such as the email server 16. The email server 16 communicates with the message processor 18 for establishing a temporary mailbox associated with a specific callback number, which was assigned to a message.

When the message processor 18 receives a call directed to a specific callback number, the message processor 18 prompts the mobile phone user to dictate a reply message for the specific recipient identified by header information contained in the original message (step 216). The message processor 18. records the voice reply message, notifies the email server 16 of the voice message, and provides the email server with the callback telephone number that the user dialed (or that the mobile phone 10 automatically dialed in response to the user activating the reply command) (step 218).

The email server 16 uses the callback telephone number to retrieve the email message associated therewith (step 220). The email server 16 then transmits to the originator of the email message associated with the callback telephone number at least the voice message recorded by the message processor 18 (step 222). In one embodiment, only the voice message is transmitted, in other embodiments, the voice message plus the email message associated with the callback number are transmitted.

The message processor 18 may be replaced with another type of processor depending on the media type. For example, instead of utilizing a voice message processor, a video message processor may be utilized in a broadband system for sending video messages from a mobile phone.

Messages sent from the email server may be transported over the Internet 20 or a private network. The mobile system 14, email system 16 and message processor 18 may be directly connected or they may be connected via a network such as the Internet or the public switched telephone network.

As described above, a mobile phone user may reply to messages that were not transmitted in their entirety to the mobile phone 10. In one embodiment, a mobile phone user might receive only a name for identifying the message originator and/or a subject but not the body of the message. Such would be the case in a system that allows the mobile phone user to decide which messages should be transmitted. In the case where the user does not receive the entire message, the mobile phone user could reply to the originator of the message stating, "I will attend to your message when I return to the office." Optionally, the mobile phone user could read the subject matter and then send a request message to the email server 16, which causes the email server to transmit the entire message or the remainder of the message. Lastly, a mobile phone 10 equipped with a web browser may connect to an Internet based mail system for reading messages. A reply code, callback number or message code may be embedded in the internet mail based message, thereby enabling a mobile phone user to reply to a specific message as described above.

A significant feature of the -present invention described above is the ability to "directly access" a specific message from the mobile phone 10 for replying to or for performing an action thereon. Each message transmitted to or accessed from the mobile phone 10 has a message ID associated therewith. A mobile phone user (for example) may reply to a message, delete a message from the email server 16 without retrieving the entire message, forward a message and retrieve a message. The user may also mistakenly delete a message stored in the mobile phone 10 and then retrieve it again from the email server 16. Unlike prior art email and voice mail systems, the present invention provides for direct access of remotely stored messages for retrieval and for performing an action associated therewith, as is described in the above mentioned related U.S. patent application Ser. Nos. 08/934,143, 08/933, 344, 08/934,132, and 08/934,337.

The invention of FIG. 1 is shown configured with one email server 16 and one message processor 18. However, multiple email servers 16 and or message processors 18 may be configured in the system, for example, via network connection, direct connect, or the Internet. This approach, when used in conjunction with the email industry standard POP3 mail, allows the mobile phone user to access email from a plurality of email systems.

Any email server 16 may send message alerts, header information, message codes, subject matter, or the body of a message to the mobile system 14 for transmission to the mobile phone 10. Alternatively, the email server 16 and or the message processor 18 (shown in FIG. 1) may act as a master system for commutating with the mobile system 14 and slave email servers 16 and or slave message processors 18 may be configured to communicate with the master email server 16 and or a master voice processor 18 for communicating with the mobile phone 10.

As previously stated, a mobile phone user may receive any part of the message or the entire message. While some mobile phone users may decide to have the system alert them and automatically deliver the entire message, other mobile phone users (power users) may wish to be alerted and automatically receive only the sender's name and the subject of the email message. The mobile phone user may then decide to retrieve the message, delete the message, forward the message or reply to the message. The present invention provides the mobile phone user direct access to and remote control of email messages regardless of where the email messages reside.

The mobile phone 10 can originate email messages by utilizing an address book or by direct entry of an address or an abbreviated address. The address book may be stored in the mobile phone 10, on the email server 16 or in the message processor 18. The mobile phone user may simply select a name from the mobile phone's 10 address book, activate a send message command and send a message to the message processor 18 for delivery to the email server 16 and finally to the addressed destination as previously described.

In another embodiment, the mobile phone user may enter the address manually or enter an abbreviated address associated with the actual address stored on the email server 16 and or the message processor 18. In another embodiment, the mobile phone user may utilize a mobile phone 10 that has Internet access capability such as the so-called "smart phones". Upon accessing the Internet, the mobile phone user may access an Internet based email system such as Hot Mail, Yahoo Mail and the like. The Mobile phone user may then choose a message to read, reply to a message or select a name from an address book for originating a message. The user then selects a send command for sending a message (digital, analog, or other) to the Internet based email system or the email server 16. The selected address book entry may contain addressing information for identifying a particular email server or message processor. Upon the mobile phone user's selection of a message recipient, the mobile phone 10 connects to the identified email server 16, message processor 18, or another system for delivering the email message. An email message may also be routed to a particular system based on the type of email message For example, a voice message may be directed to a voice message processor and a text message may be directed to an email server. The mobile phone 10 may connect to the Internet for sending a-message or a phone call may be placed to the message processor 18. Alternatively, a mobile phone user may indicate to an email server that he/she wishes to send a message, such as a voice message, to a particular destination. The email server then informs the message processor 18 that the specific mobile phone user wishes to send a message. The message processor then places a call (or connects) to the mobile phone 10 and prompts the mobile phone user to record a message as previously described.

The present invention provides for receiving an email message that has an attachment (i.e., an attached file). The mobile phone 10 does not need any special modifications to receive a text message and for example a voice attachment (i.e., the attached file contains a voice message). When a mobile phone 10 receives a text message having an attachment associated therewith, the mobile phone user may receive all or a portion of the text message, header information, an alert, and a message code which identifies the attachment. To hear the voice message attachment, delete the voice message, reply to the originator of the voice message, or forward the voice message to other people, the mobile phone user simply places a call to the message processor 18, enters the message code that identifies the attachment using a keypad (or if the message processor 18 has voice recognition capability, simply speaks the message code), and enters a code corresponding to an action or speaks a command, such as reply, delete, forward, save, etc. The message processor 18 performs the command.

That is, the message processor 18, upon receiving a call from a mobile phone user, may be configured to identify the mobile phone user utilizing the industry standard caller ID. After identifying the mobile phone user, the message processor prompts the mobile phone user to enter the message code associated with the received message for retrieving the corresponding voice attachment. The voice message file corresponding to the message code is then accessed by the message processor 18. The message processor 18 then plays the message to the mobile phone user over the telephone connection so that the mobile phone user can hear the attachment.

In this manner, unlike prior art voice mail systems, the present invention provides direct access to a specific message. The mobile phone user need not scroll through a large number of messages in order to locate a specific message.

Upon accessing a message file, the message processor 18 allows the user to erase the message, forward the message, or record a reply for the voice message originator. In another embodiment, the mobile telephone may be configured to automatically transmit a message code to a specific message processor as previously described. The main difference between a message code for retrieving a voice attachment and a reply code is that a message code for retrieving a message directs the message processor to play the message while a reply code directs the message processor 18 to record a reply message.

Voice attachments may be retrieved manually by entering a message code or automatically. The mobile phone user may place a call directly to a specific message processor 18 or the call may be automatically directed to a specific message processor that corresponds to a received system identification code or the call may be directed to a specific telephone number associated to the mailbox within the message processor 18 where a specific message resides.

The mobile phone user may additionally access a voice message by accessing a web based email system with a browser-enabled mobile phone 10. The web based email server may supply the message code and upon a mobile phone user activating a retrieve command, the mobile phone 18 places a call to a message processor 18. Alternatively, the web based email server may notify the message processor 18 and the message processor 18 then connects with (or calls) the mobile phone 10 and plays the message to the mobile phone user. The message processor 18 is adapted to play an analog voice file or a digital voice file. The voice message may be streamed to the mobile phone 10 for real time reproduction or the voice file may be transferred to the mobile phone 10 for storage in a memory device within the mobile phone 10. The message is not limited to an analog or digital voice message buy may include streaming video or other multimedia content.

It has been clearly shown that an email text message and an attachment may be received or retrieved by the mobile phone 10. Email messages may be sent to the mobile phone 10 from a number of devices such as for example, a computer with Internet access to a web based email system or from a computer utilizing an email program. The present invention additionally provides for sending email messages from a mobile phone 10 to another mobile phone 10 (i.e. mobile-to-mobile) or to itself (i.e. memo mode). A mobile originated voice message may be recorded and addressed by a mobile phone user to a targeted mobile phone 10. The difference between sending a message to a computer or to a mobile phone 10 is simply the address. The present invention makes it possible to communicate two-way email, including attachments between a computer and a mobile phone and between mobile phones. Mobile phone users need not scroll through messages to access a specific message. Messages may be directly accessed for performing an action thereto. A mobile phone user may simply select a destination address, activate a send message command and record a voice email for any targeted destination. A mobile phone user may activate a reply command and record a voice email that is automatically or manually addressed to a message originator. Messages may be automatically received, manually retrieved, replied to, forwarded, deleted, originated and reproduced by the mobile phone 10. The need for a mobile phone to have browser capability for accessing the Internet to communicate two-way email is eliminated.

As previously stated, the present invention may be configured to deliver entire text email messages to a mobile phone 10 or just a portion of the message, such as the name of the originator and/or the subject. Additionally, a message may be received from the email server 16 on demand by the mobile phone 10. A mobile phone user may automatically receive a name and subject information but may not wish to automatically receive the entire message. After the mobile user reviews the received names and associated subjects, the mobile phone user may decide to retrieve the remainder of the message or the entire message.

A message may be deleted from the mobile phone 10 but it may be again retrieved from the email server 10, if the message is still stored on the email server 10 as previously described. The ability to retrieve a specific message on demand allows for new and improved features for the mobile phone 10, a paging device or other types of wireless email and messaging devices.

One such feature of the present invention is an improved memory management arrangement and method for automatically deleting messages stored in a mobile phone or messaging device when the device's memory is full. For example, prior art paging devices have a limited amount of memory for storing messages. There are times when the memory is full of messages and new messages cannot be received and stored. Other paging devices automatically delete the oldest read message in order to make room in memory for a newly received message. These prior art devices and methods have a disadvantage because once a message is deleted or over written, it cannot be recovered. The present invention provides a system for deleting messages when memory is full but the deleted or over written messages may be again received and stored by the mobile telephone 10 as will be described hereinafter.

The mobile phone 10 may be configured so that an internal processor executes the following process: Receive and store messages in memory. When a message is received and memory is full, over write one or more message bodies, but retain the message header and the message ID associated with the message, to make room for the new message. Store the new message. When over writing message bodies, over write the oldest read message body first, when there are no read message bodies left, over write the oldest unread message body. When there are no more message bodies, over write the oldest read subject first. When there are no more read subjects, over write the oldest unread subject. The mobile phone 10 may be configured to delete the name and header information using the same priority as described above.

The above-described process causes the mobile phone 10 to over write only message bodies when there is not enough memory to store an additional message. The mobile phone user may continue to save and view information that identifies the message originator (the name) and information describing the message (the subject). If the mobile phone user desires to read an entire message body that was deleted or over written, a retrieve command may be activated by the mobile phone user for causing the mobile phone 10 to transmit the selected message ID to the email server 16. Upon receiving the retrieval request and message ID, the email server 16 sends the email message corresponding to the message ID to the requesting mobile phone 10. An over written or deleted message can now be recovered.

The present invention provides for sending and receiving messages based on one or more variables. The email server 16 and the message processor 18 may be configured with Instant Messenger software such as is provided by Microsoft, America On Line, AT&T and others. These programs provide notification when a computer-messaging device is on line or the operator is logged in. When the message processor 18 or email server 16 receives a message for the mobile phone 10, the message may be held until the mobile phone is on line. In other words, when the user is logged in or when the presence of the user is detected, the message is delivered. Conversely, when a message is sent to a mobile phone 10, the message may be held by the email server 16 or the message processor 18 until the presence of the mobile phone 10 or the mobile phone user is detected. Detection of the mobile phone 10 may for example be accomplished by interfacing a home location register (HLR) to the email server 16 and the message processor 18. HLR equipment is readily available and used extensively by mobile phone companies to provide detection of a mobile phone in a particular service area in order to route calls. Detection of a mobile phone user may also be accomplished by detecting user-activated commands that are transmitted to the email server 16 or the message processor 18. Detection of an operator, mobile phone user or active messaging device enables the present invention to perform actions responsive to the status of messaging devices or the presence of their respective user. The email server 16 may automatically route messages to a mobile phone 10 when the mobile phone user is utilizing the mobile phone 10. Then, when the mobile phone user turns the mobile phone 10 off and logs in to an office computer, the email server routes messages to the office computer. The present invention may perform any number of actions or combination of actions based on a mobile phone user activated command or by automatically detecting the status of the mobile phone 10 and or the presence of the mobile phone user. Messages may even be redirected automatically to a mobile phone user's computer email service if the message cannot be delivered to the mobile phone 10 because the mobile phone 10 was out of range or turned off.

The email server 16 and the message processor 18 may automatically perform an action or sequence of actions based on the time of day, the date, the status of a mobile phone 10, the presence of a user, user activity, geographic location of the mobile phone 10 (302) or any number of conditions which may be transmitted to the email server 16 or the message processor 18. Sensors may be added to the mobile phone 10 and data from the sensors may be automatically transmitted or manually sent by the mobile phone user. A temperature sensor, for example, may be included in the mobile phone 10 wherein temperature readings are automatically transmitted to the email server 16 (304). Based on temperature, the location of the mobile phone 10 and the presence of the mobile phone user, the email server 16 or the message processor may for example send an email message to the mobile phone (306) user that includes an advertisement stating, "The temperature is 98 degrees. Please drink Coke. 35 cent special one block away at the super store." Alternatively, the mobile phone user may configure the present invention so that messages from particular people are delivered to the mobile phone 10 on week days between 9:00 am and 5:00 pm but otherwise routed to the mobile phone user's home computer and have copies of all message activity go to an office email system. Messages may also be filtered based on the location of the mobile phone 10 so that very important messages are routed to the mobile phone 10 when the mobile phone user is out of town with the mobile phone 10. A mobile phone user may also configure the system to send a notification message to the mobile phone 10 when another mobile phone 10 user or a computer device user is detected by the email server 16 or the message processor 18.

The present invention may be utilized in telephone systems, paging systems, email systems, and numerous communications systems.

What is claimed is:

1. A method that provides information from an internet server to a cell phone based on a physical location of the cell phone and temperature detected by the cell phone comprising:

(a) receiving at the internet server from the cell phone the physical location of the cell phone, the physical location detected by the cell phone using a location sensor included in the cell phone;

(b) receiving at the internet server from the cell phone data corresponding to a temperature that is external to the cell phone, the temperature detected by the cell phone using a temperature sensor included in the cell phone;

(c) selecting from a database relevant information related to the detected physical location of the cell phone and the detected temperature; and (d) sending from the internet server the selected information to the cell phone.

2. The method of claim 1 wherein the selected information includes an indication of a location of a product of potential interest to a user of the cell phone.

3. The method of claim 2 wherein the product comprises a consumer item or service.

4. The method of claim 2 further comprising indicating the location of the product relative to the detected physical location of the cell phone.

5. The method of claim 1 wherein the selected information comprises an advertisement of a product or service.

6. The method of claim 1 wherein the relevant information includes pricing information.

\* \* \* \* \*